United States Patent
Hofmann

(10) Patent No.: US 9,579,718 B2
(45) Date of Patent: Feb. 28, 2017

(54) SYSTEMS AND METHODS FOR FABRICATING OBJECTS INCLUDING AMORPHOUS METAL USING TECHNIQUES AKIN TO ADDITIVE MANUFACTURING

(71) Applicant: California Institute of Technology, Pasadena, CA (US)

(72) Inventor: Douglas Hofmann, Pasadena, CA (US)

(73) Assignee: California Institute of Technology, Pasadena, CA (US)

(*) Notice: Subject to any disclaimer, the term of this patent is extended or adjusted under 35 U.S.C. 154(b) by 185 days.

(21) Appl. No.: 14/163,936

(22) Filed: Jan. 24, 2014

(65) Prior Publication Data
US 2014/0202595 A1 Jul. 24, 2014

Related U.S. Application Data

(60) Provisional application No. 61/756,157, filed on Jan. 24, 2013.

(51) Int. Cl.
*B22D 23/00* (2006.01)
*B22F 3/105* (2006.01)
(Continued)

(52) U.S. Cl.
CPC .......... *B22D 23/003* (2013.01); *B22F 3/1055* (2013.01); *B22F 3/115* (2013.01);
(Continued)

(58) Field of Classification Search
CPC .......... B22D 23/003; C23C 4/08; C23C 4/185; C22C 45/00; C22C 2200/02; B22F 3/1055; B22F 2003/247
See application file for complete search history.

(56) References Cited

U.S. PATENT DOCUMENTS 3,519,444 A * 7/1970 Brown .................. B22C 3/00
106/266
RE29,989 E 5/1979 Polk
(Continued)

FOREIGN PATENT DOCUMENTS

EP 1063312 A1 12/2000
EP 1138798 A1 10/2001
(Continued)

OTHER PUBLICATIONS

Fu et al., "Sliding behavior of metallic glass Part I. Experimental investigations", Wear, 2001, vol. 250, pp. 409-419.
(Continued)

*Primary Examiner* — Jessee Roe
*Assistant Examiner* — John Hevey
(74) *Attorney, Agent, or Firm* — Kilpatrick Townsend & Stockton LLP

(57) ABSTRACT

Systems and methods in accordance with embodiments of the invention fabricate objects including amorphous metals using techniques akin to additive manufacturing. In one embodiment, a method of fabricating an object that includes an amorphous metal includes: applying a first layer of molten metallic alloy to a surface; cooling the first layer of molten metallic alloy such that it solidifies and thereby forms a first layer including amorphous metal; subsequently applying at least one layer of molten metallic alloy onto a layer including amorphous metal; cooling each subsequently applied layer of molten metallic alloy such that it solidifies and thereby forms a layer including amorphous metal prior to the application of any adjacent layer of molten metallic alloy; where the aggregate of the solidified layers including amorphous metal forms a desired shape in the object to be fabricated; and removing at least the first layer including amorphous metal from the surface.

26 Claims, 23 Drawing Sheets

(51) Int. Cl.

| | | |
|---|---|---|
| *C22C 45/00* | (2006.01) | |
| *C22C 45/10* | (2006.01) | |
| *C23C 4/08* | (2016.01) | |
| *C23C 4/18* | (2006.01) | |
| *B22F 3/115* | (2006.01) | |
| *B22F 3/24* | (2006.01) | |

(52) U.S. Cl.
CPC ............... *C22C 45/00* (2013.01); *C23C 4/08* (2013.01); *C23C 4/185* (2013.01); *B22F 2003/247* (2013.01); *C22C 2200/02* (2013.01); *Y02P 10/295* (2015.11)

(56) References Cited

U.S. PATENT DOCUMENTS

| | | | |
|---|---|---|---|
| 4,173,393 | A | 11/1979 | Maurer |
| 4,202,404 | A | 5/1980 | Carlson |
| 4,711,795 | A | 12/1987 | Takeuchi et al. |
| 4,810,314 | A | 3/1989 | Henderson et al. |
| 4,812,150 | A | 3/1989 | Scott |
| 4,851,296 | A | 7/1989 | Tenhover et al. |
| 5,288,344 | A | 2/1994 | Peker et al. |
| 5,746,844 | A * | 5/1998 | Sterett ............... B22F 3/115 148/522 |
| 5,772,803 | A | 6/1998 | Peker et al. |
| 6,771,490 | B2 | 8/2004 | Peker et al. |
| 6,843,496 | B2 | 1/2005 | Peker et al. |
| 6,887,586 | B2 | 5/2005 | Peker et al. |
| 7,073,560 | B2 | 7/2006 | Kang et al. |
| 7,075,209 | B2 | 7/2006 | Howell et al. |
| 7,323,071 | B1 * | 1/2008 | Branagan ............ C22C 33/0285 148/561 |
| 7,357,731 | B2 | 4/2008 | Johnson et al. |
| 7,360,419 | B2 | 4/2008 | French et al. |
| 7,500,987 | B2 | 3/2009 | Bassler et al. |
| 7,896,982 | B2 | 3/2011 | Johnson et al. |
| 8,400,721 | B2 | 3/2013 | Bertele et al. |
| 9,044,805 | B2 * | 6/2015 | Prest ............... B22D 19/00 |
| 2002/0100573 | A1 | 8/2002 | Inoue et al. |
| 2003/0062811 | A1 | 4/2003 | Peker et al. |
| 2007/0034304 | A1 | 2/2007 | Inoue et al. |
| 2008/0085368 | A1 * | 4/2008 | Gauthier ............... C23C 14/28 427/314 |
| 2009/0114317 | A1 | 5/2009 | Collier et al. |
| 2012/0006085 | A1 * | 1/2012 | Johnson ............... B21D 26/14 72/54 |
| 2012/0073710 | A1 | 3/2012 | Kim et al. |
| 2013/0139964 | A1 | 6/2013 | Hofmann et al. |
| 2014/0010968 | A1 * | 1/2014 | Prest ............... C23C 4/02 427/456 |
| 2014/0141164 | A1 | 5/2014 | Hofmann |
| 2014/0224050 | A1 | 8/2014 | Hofmann et al. |
| 2014/0227125 | A1 | 8/2014 | Hofmann |
| 2014/0246809 | A1 | 9/2014 | Hofmann |

FOREIGN PATENT DOCUMENTS

| | | |
|---|---|---|
| EP | 1404884 B1 | 7/2007 |
| EP | 1944138 A2 | 7/2008 |
| WO | 2014058498 A3 | 4/2014 |

OTHER PUBLICATIONS

Kozachkov et al., "Effect of cooling rate on the vol. fraction of B2 phases in a CuZrAlCo metallic glass matrix composite", Intermetallics, 2013, vol. 39, pp. 89-93.

Introduction to Thermal Spray Processing, ASM International, Handbook of Thermal Spray Technology (#06994G), 2004, 12 pgs.

An et al., "Synthesis of single-component metallic glasses by thermal spray of nanodroplets on amorphous substrates", Applied Physics Letters, 2012, vol. 100, pp. 041909-1-041909-4.

Branagan et al., "Wear Resistant Amorphous and Nanocomposite Steel Coatings", Met. Mater. Trans. A, 2001, 32A; 15 pgs.

Cadney et al., "Cold gas dynamic spraying as a method for freeforming and joining materials", Surface & Coatings Technology, 202, 2008, pp. 2801-2806, Oct. 17, 2007.

Cheng, "Characterization of mechanical properties of FeCrBSiMn-NbY metallic glass coatings", J Mater Sci., 2009, vol. 44, pp. 3356-3363.

Ganesan et al. "Bonding behavior studies of cold sprayed copper coating on the PVC polymer substrate", Surface & Coatings Technology, 2012, vol. 207, pp. 262-269.

Hejwowski et al., , "A comparative study of electrochemical properties of metallic glasses and weld overlay coatings", Vacuum 88 (2013) 118-123, Feb. 20, 2012.

Hong et al., "Microstructurel characteristics of high-velocity oxygen-fuel (HVOF) sprayed nickel-based alloy coating", Journal of Alloys and Compounds 581 (2013) pp. 398-403, Jul. 26, 2013.

Kim, "Amorphous phase formation of Zr-based alloy coating by HVOF spraying process", Journal of Materials Science, 2001, vol. 36, pp. 49-54.

Kim et al. "Enhancement of metallic glass properties of Cu-based BMG coating by shroud plasma spraying", Surface & Coatings Technology 205 (2011) pp. 3020-3026.

Kim et al. "Oxidation and crystallization mechanisms in plasma-sprayed Cu-based bulk metallic glass coatings", Acta Materialia. 2010, vol. 58, pp. 952-962.

Kim et al., "Production of Ni65Cr15P16B4 Metallic Glass-Coated Bipolar Plate for Fuel Cell by High Velocity Oxy-Fuel (HVOF) Spray Coating Method", The Japan Institute of Metals, Materials Transactions, vol. 51, No. 9 (2010) pp. 1609-1613.

Kobayashi et al. "Property of Ni-Based Metallic Glass Coating Produced by Gas Tunnel Type Plasma Spraying", International Plasma Chemistry Society, ISPC 20, 234, Philadelphia, USA; Retrieved from: http://www.ispc-conference.org/ispcproc/ispc20/234.pdf.

Kobayashi et al., "Fe-based metallic glass coatings produced by smart plasma spraying process", Materials Science and Engineering B (2007), 4 pgs.

Kobayashi et al., , "Mechanical property of Fe-base metallic glass coating formed by gas tunnel type plasma spraying", Surface & Coatings Technology (2007), 6 pgs.

Lillo et al., "Microstructure, Processing, Performance Relationships for High Temperature Coatings", U.S. Department of Energy, Office of Fossil Energy, under DOE Idaho Operations Office, Contract DE-AC07-05ID14517; 22nd Annual Conference on Fossil Energy Materials, Pittsburgh, U.S., 8 pgs.

List et al. "Impact Conditions for Cold Spraying of Hard Metallic Glasses", Journal of Thermal Spray Technology, Jun. 2012, vol. 21, No. 3-4, pp. 531-540.

Liu, X. Q. "Microstructure and properties of Fe-based amorphous metallic coating produced by high velocity axial plasma spraying", Science Direct, Journal of Alloys and Compounds 484 (2009) pp. 300-307.

Lupoi et al. "Deposition of metallic coatings on polymer surfaces using cold spray", Science Direct, Surface & Coatings Technology 205 (2010) pp. 2167-2173.

Ni., "High performance amorphous steel coating prepared by HVOF thermal spraying", Journal of Alloys and Compounds 467 (2009) pp. 163-167.

Revesz et al. "Microstructure and morphology of Cu—Zr—Ti coatings produced by thermal spray and treated by surface mechanical attrition", Journal of Alloys and Compounds 509S (2011) S482-S485.

Yin et al. "Microstructure and mechanical properties of a spray-formed Ti-based metallic glass former alloy", Journal of Alloys and Compounds 512 (2012) 241-245.

Zhang et al. "Robust hydrophobic Fe-based amorphous coating by thermal spraying", Applied Physics Letters 101, m 2012, pp. 1216031-121603-4.

Zhou et al., "Microstructure and Electrochemical Behavior of Fe-Based Amorphous Metallic Coatings Fabricated by Atmospheric Plasma Spraying", Journal of Thermal Spray Technology, Jan. 2011, vol. 20, No. 1-2, pp. 344-350.

(56) References Cited

OTHER PUBLICATIONS

Zhuo, "Spray formed Al-based amorphous matrix nanocomposite plate", Journal of Alloys and Compounds 509 (2011) L169-L173.
International Search Report and Written Opinion for International Application No. PCT/US2013/050614, Search Completed May 7, 2014, Mailed May 7, 2014, 12 pgs.
"Harmonic Drive AG", website, printed from http://harmoncdrive.aero/?idcat=471, Feb. 20, 2014, 2 pgs.
"Harmonic Drive Polymer GmbH", printed Feb. 20, 2014 from http://www.harmonicdrive.de/English/the-company/subsidiaries/harmonic-drive-polymer-gmbh.html, 1 pg.
"International Search Report and Written Opinion for International Application PCT/US2013/047950", completed Oct. 8, 2013, 9 pgs.
Abrosimova et al., "Crystalline layer on the surface of Zr-based bulk metallic glasses", Journal of Non-Crystalline solids, 2001, vol. 288, pp. 121-126.
Anstis et al., "A Critical Evaluation of Indentation Techniques for Measuring Fracture Toughness: I, Direct Crack Measurements", Journal of American Ceramic Society, Sep. 1981, vol. 64, No. 8, pp. 533-538.
Ashby et al., "Metallic glasses of structural materials", Scripta Materialia, 2006, vol. 54, pp. 321-326.
Bakkal, "Sliding tribological characteristics of Zr-based bulk metallic glass under lubricated conditions", Intermetallics, 2010, vol. 18, pp. 1251-1253.
Bardt et al., "Micromolding three-dimensional amorphous metal structures", J. Mater. Res, Feb. 2007, vol. 22, No. 2, pp. 339-343.
Basu et al., "Laser surface coating of Fe—Cr—Mo—Y—B—C bulk metallic glass composition on AISI 4140 steel", Surface & Coatings Technology, 2008, vol. 202, pp. 2623-2631.
Boopathy et al., "Near-threshold fatigue crack growth in bulk metallic glass composites", J. Mater. Res., vol. 24, No. 12, pp. 3611-3619.
Calin et al., "Improved mechanical behavior of Cu—Ti-based bulk metallic glass by in situ formation of nanoscale precipitates", Scripta Materialia, 2003, vol. 48, pp. 653-658.
Chen et al., "Elastic Constants, Hardness and Their Implications to Flow Properties of Metallic Glasses", Journal of Non-crystalline Solids, 1975, vol. 18, pp. 157-171.
Chen et al., "Formation of Micro-Scale Precision Flexures Via Molding of Metallic Glass", Source and date unknown, 4 pgs.
Chen et al., "Influence of laser surface melting on glass formation and tribological behaviors of $Zr_{55}Al_{10}Ni_5Cu_{30}$ alloy", J. Mater Res. Oct. 28, 2011, vol. 26, No. 20, pp. 2642-2652.
Choi et al., "Tribological behavior of the kinetic sprayed $Ni_{59}Ti_{16}Zr_{20}Si_2Sn_3$", Journal of Alloys and Compounds, 2007, vol. 434-435, pp. 64-67.
Conner et al., "Shear band spacing under bending of Zr-based metallic glass plates", Acta Materialia, 2004, vol. 52, pp. 2429-2434.
Conner et al., "Shear bands and cracking of metallic glass plates in bending", Journal of Applied Physics, Jul. 15, 2003, vol. 94, No. 2, pp. 904-911.
Dai et al., "A new centimeter-diameter Cu-based bulk metallic glass", Scripta Materialia, 2006, vol. 54, pp. 1403-1408.
Davis, "Hardness/Strength Ratio of Metallic Glasses", Scripta Metallurgica, 1975, vol. 9, pp. 431-436.
De Beer et al., "Surface Folds Make Tears and Chips", Physics, 2012, vol. 100, 3 pgs.
Dislich et al., "Amorphous and Crystalline Dip Coatings Obtained from Organometallic Solutions: Procedures, Chemical Processes and Products", Metallurgical and Protective Coatings, 1981, vol. 77, pp. 129-139.
Duan et al., "Lightweight Ti-based bulk metallic glasses excluding late transition metals", Scripta Materialia, 2008, vol. 58, pp. 465-468.
Duan et al., "Tribological properties of $Zr_{41.25}Ti_{13.75}Ni_{10}Cu_{12.5}Be_{22.5}$ bulk metallic glasses under different conditions", Journal of Alloys and Compounds, 2012, 528. pp. 74-78.
Fleury et al., "Tribological properties of bulk metallic glasses", Materials Science and Engineering, 2004, vol. A375-A377, pp. 276-279.
Fornell et al., "Enhanced mechanical properties and in vitro corrosion behavior of amorphous and devitrified $Ti_{40}Zr_{10}Cu_{38}Pd_{12}$ metallic glass", Journal of the Mechanical Behavior of Biomedical Materials, 2011, vol. 4, pp. 1709-1717.
Garrett et al., "Effect of microalloying on the toughness of metallic glasses", Applied Physics Letter, 2012, vol. 101, 241913-1-241913-3.
Gleason Corporation, "Gear Product News", Introducing genesis, The Next Generation in Gear Technology, Apr. 2006, 52 pgs.
Gloriant, "Microhardness and abrasive wear resistance of metallic glasses and nanostructured composite materials", Journal of Non-Crystalline Solids, 2003, vol. 316, pp. 96-103.
Greer, "Partially or fully devitrified alloys for mechanical properties", Materials and Science and Engineering, 2001, vol. A304, pp. 68-72.
Greer et al., "Wear resistance of amorphous alloys and related materials", International Materials Reviews, 200, vol. 47, No. 2, pp. 87-112.
Hale, "Principles and Techniques for Designing Precision Machines", Ph.D. Thesis, Feb. 1999, 493 pgs.
Haruyama et al., "Volume and enthalpy relaxation in $Zr_{55}Cu_{30}Ni_5Al_{10}$ bulk metallic glass", Acta Materialia, 2010, vol. 59, pp. 1829-1836.
Hofmann, "Bulk Metallic Glasses and Their Composites: A Brief History of Diverging Fields", Journal of Materials, 2013, vol. 2013, 7 pgs.
Hofmann, "Shape Memory Bulk Metallic Glass Composites", Science, Sep. 10, 2010, vol. 329, pp. 1294-1295.
Hofmann et al., "Designing metallic glass matrix composites with high toughness and tensile ductility", Nature Letters, Feb. 28, 2008, vol. 451, pp. 1085-1090.
Hofmann et al., "Semi-solid Induction Forging of Metallic Glass Matrix Composites", JOM, Dec. 2009, vol. 61, No. 12, pp. 11-17, plus cover.
Hong et al., "Dry sliding tribological behavior of Zr-based bulk metallic glass", Trans. Nonferrous Met. Soc. China, 2012, vol. 22, pp. 585-589.
Huang et al., "Fretting wear behavior of bulk amorphous steel", Intermetallics, 2011, vol. 19, pp. 1385-1389.
Inoue et al., "Cobalt-based bulk glassy alloy with ultrahigh strength and soft magnetic properties", Nature Materials, Oct. 2003, vol. 2, pp. 661-663.
Inoue et al., "Preparation of 16 mm diameter Rod of Amorphous $Zr_{65}Al_{7.5}Ni_{10}Cu_{17.5}$ Alloy", Material Transactions, JIM, 1993, vol. 34, No. 12, pp. 1234-1237.
Ishida et al., "Wear resistivity of super-precision microgear made of Ni-based metallic glass", Materials Science and Engineering, 2007, vol. A449-A451, pp. 149-154.
Jiang et al, "Progress in low density bulk metallic glasses and their composites", pp. 1-56.
Jiang et al., "Tribological Studies of a Zr-Based Glass-Forming Alloy with Different States", Advanced Engineering Materials, 2009, vol. 1, No. 11, pp. 925-931.
Kahraman et al., "A Feasibility Study on Development of Dust Abrasion Resistant Gear Concepts for Lunar Vehicle Gearboxes", NASA Grant NNX07AN42G Final Report, Mar. 11, 2009, 77 pgs.
Kong et al., "Effect of Flash Temperature on Tribological Properties of Bulk Metallic Glasses", Tribol. Lett., 2009, vol. 35, pp. 151-158.
Kumar et al., "Bulk Metallic Glass: The Smaller the Better", Advanced Materials, 2001, vol. 23, pp. 461-476.
Kwon et al., "Wear behavior of Fe-based bulk metallic glass composites", Journal of Alloys and Compounds, 2011, vol. 509S, pp. S105-S108.
Launey et al., "Solution to the problem of the poor cyclic fatigue resistance of bulk metallic glasses", PNAS Early Edition, pp. 1-6.
Li et al., "Wear behavior of bulk $Zr_{41}Ti_{14}Cu_{12.5}Ni_{10}Be_{22.5}$ metallic glasses", J. Mater. Res., Aug. 2002, vol. 17, No. 8, pp. 1877-1880.
Liu et al., "Influence of Heat Treatment on Microstructure and Sliding Wear of Thermally Sprayed Fe-Based Metallic Glass coatings", Tribol. Lett., 2012, vol. 46, pp. 131-138.

(56) References Cited

OTHER PUBLICATIONS

Liu et al., "Metallic glass coating on metals plate by adjusted explosive welding technique", Applied Surface Science, 2009, vol. 255, pp. 9343-9347.
Liu et al., "Sliding Tribological Characteristics of a Zr-based Bulk Metallic Glass Near the Glass Transition Temperature", Tribol. Lett. 2009, vol. 33, pp. 205-210.
Liu et al., "Wear behavior of a Zr-based bulk metallic glass and its composites", Journal of Alloys and Compounds, 2010, vol. 503, pp. 138-144.
Ma et al., "Wear resistance of Zr-based bulk metallic glass applied in bearing rollers", Materials Science and Engineering, 2004, vol. A386, pp. 326-330.
Maddala et al., "Effect of notch toughness and hardness on sliding wear of Cu50Hf41.5A18.5 bulk metallic glass", Scripta Materialia, 2011, vol. 65, pp. 630-633.
Parlar et al., "Sliding tribological characteristics of Zr-based bulk metallic glass", Intermetallics, 2008, vol. 16, pp. 34-41.
Pauly et al., "Modeling deformation behavior of Cu—Zr—Al bulk metallic glass matrix composites", Applied Physics Letters, 2009, vol. 95, pp. 101906-1-101906-3.
Ponnambalam et al., "Fe-based bulk metallic glasses with diameter thickness larger than one centimeter", J Mater Res, 2004. vol. 19; pp. 1320-1323.
Porter et al., "Incorporation of Amorphous Metals into MEMS for High Performance and Reliability", Rockwell Scientific Company, Final Report, Nov. 2003, 41 pgs.
Prakash et al., "Sliding wear behavior of some Fe-, Co-and Ni-based metallic glasses during rubbing against bearing steel", Tribology Letters, 2000, vol. 8, pp. 153-160.
Ramamurty et al., "Hardness and plastic deformation in a bulk metallic glass", Acta Materialia, 2005, vol. 53, pp. 705-717.
Rigney et al., "The Evolution of Tribomaterial During Sliding: A Brief Introduction", Tribol. Lett, 2010, vol. 39, pp. 3-7.
Roberts et al., "Cryogenic Charpy impact testing of metallic glass matrix composites", Scripta Materialia, 2011, 4 pgs.
Schuh et al., "A survey of instrumented indentation studies on metallic glasses", J. Mater. Res., Jan. 2004, vol. 19, No. 1, pp. 46-57.
Segu et al., "Dry Sliding Tribological Properties of Fe-Based Bulk Metallic Glass", Tribol. Lett., 2012, vol. 47, pp. 131-138.
Shen et al., "Exceptionally high glass-forming ability of an FeCoCrMoCBY alloy", Applied Physics, 2005, vol. 86, pp. 151907-1-151907-3.
Sundaram et al., "Mesoscale Folding, Instability, and Disruption of Laminar Flow in Metal Surfaces", Physical Review Letters, Sep. 7, 2012, vol. 109, pp. 106001-1-106001-5.
Tam et al., "Abrasion resistance of Cu based bulk metallic glasses", Journal of Non-Crystalline Solids, 2004, vol. 347, pp. 268-272.
Tam et al., "Abrasive wear of Cu60Zr30Ti10 bulk metallic glass", Materials Science and Engineering, 2004, vol. A384 pp. 138-142.
Tao et al., "Effect of rotational sliding velocity on surface friction and wear behavior in Zr-based bulk metallic glass", Journal of Alloys and Compounds, 2010, vol. 492, pp. L36-L39.
Tao et al., "Influence of isothermal annealing on the micro-hardness and friction property in CuZrAl bulk metallic glass", Advanced Materials Research, 2011, vols. 146-147, pp. 615-618.
Tobler et al., "Cryogenic Tensile, Fatigue, and Fracture Parameters for a Solution-Annealed 18 Percent Nickel Maraging Steel", Journal of Engineering Materials and Technology, Apr. 1978, vol. 100, pp. 189-194.
Wagner, "Mechanical Behavior of 18 Ni 200 Grade Maraging Steel at Cyrogenic Temperatures", J Aircraft, Oct. 1986, vol. 23, No. 10, pp. 744-749.
Wang et al., "Progress in studying the fatigue behavior of Zr-based bulk-metallic glasses and their composites", Intermetallics, 2009, vol. 17, pp. 579-590.
Wikipedia, "Harmonic Drive", printed Feb. 20, 2014, 4 pgs.
Wu et al., "Bulk Metallic Glass Composites with Transformation-Mediated Work-Hardening and Ductility", Adv. Mater., 2010, vol. 22, pp. 2770-2773.
Wu et al., "Effects of environment on the sliding tribological behaviors of Zr-based bulk metallic glass", Intermetallics, 2012, vol. 25, 115-125.
Zachrisson et al., "Effect of Processing on Charpy impact toughness of metallic glass matrix composites", J. Mater. Res., May 28, 2011, vol. 26, No. 10, pp. 1260-1268.
Zhang et al., "Abrasive and corrosive behaviors of Cu—Zr—Al—Ag—Nb bulk metallic glasses", Journal of Physics: Conference Series, 2009, vol. 144, pp. 1-4.
Zhang et al., "Robust hydrophobic Fe-based amorphous coating by thermal spraying", Appl. Phys. Lett. 2012, vol. 101, pp. 121603-1-121603-4.
Zhang et al., "Wear behavior of a series of Zr-based bulk metallic glasses", Materials Science and Engineering, 2008, vol. A475, pp. 124-127.
Tsai, Peter, et al.(2014), "A combinatorial strategy for metallic glass design via laser deposition", Intermetallics, 55, 162-166.
Sun, H., et al (2008), "Laser deposition of a Cu-based metallic glass powder on a Zr-based glass substrate", J. Mater. Res. 23, 2692-2703.
Zheng, B., et al. (2009), "Processing and Behavior of Fe-Based Metallic Glass Components via Laser-Engineered Net Shaping" Metallurginacal and Materials Transactions A, 40A, 1235-1245.
Zachrisson, Carl, et al. (2011) "Effect of processing on Charpy impact toughness of metallic glass matrix composites", J. Mater. Res., 26, 1260-1268.
Demetriou, Marios D., et al. (2009) "Glassy Stell Optimized for Glass-Forming ability and thoughness" Applied Physics Letters 95, 041907.
Adharapurapu, Raghavendra R., et al. (2005) "Fracture of Ti-AI3Ti metal-intermetallic laminate composites: Effects of lamination on resistance-curve behavior" Metallurgical and Materials Transactions A, 36A, 3217-3236.
Information Sheets for Thermal Spray Wires (Pure Metal Wires, Metal Alloy Wires, Carbide Wires), downloaded on May 18, 2016, from http://www.haiams.com/products/TSwires.php4, publication date unknown, 6 pages.

* cited by examiner

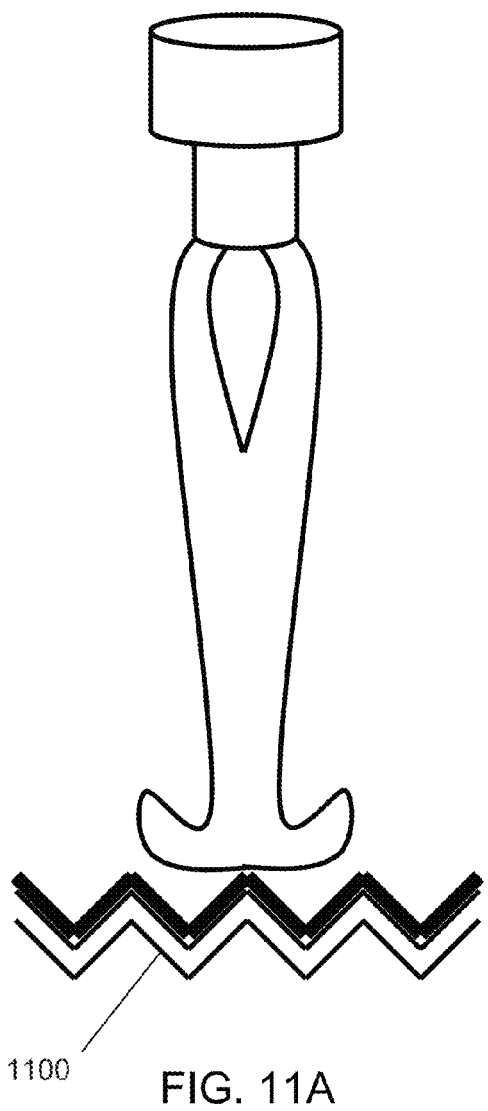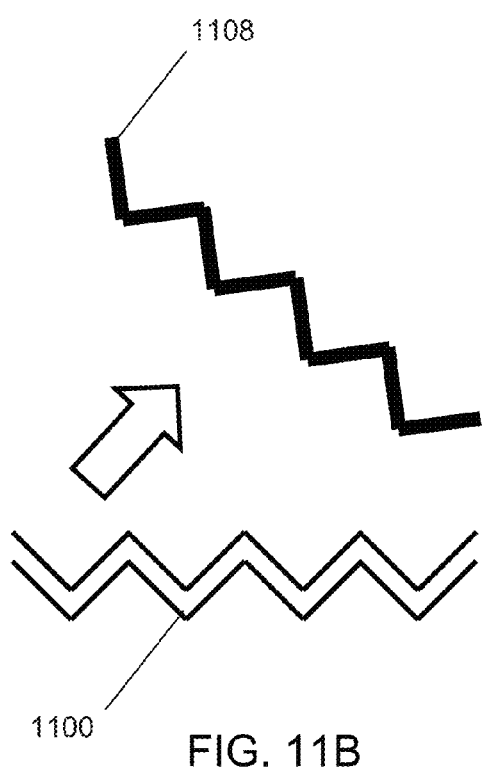
FIG. 11A
FIG. 11B

SYSTEMS AND METHODS FOR FABRICATING OBJECTS INCLUDING AMORPHOUS METAL USING TECHNIQUES AKIN TO ADDITIVE MANUFACTURING

CROSS-REFERENCE TO RELATED APPLICATIONS

The current application claims priority to U.S. Provisional Application No. 61/756,157, filed Jan. 24, 2013, the disclosure of which is incorporated herein by reference.

STATEMENT OF FEDERAL FUNDING

The invention described herein was made in the performance of work under a NASA contract, and is subject to the provisions of Public Law 96-517 (35 U.S.C. §202) in which the Contractor has elected to retain title.

FIELD OF THE INVENTION

The present invention generally regards techniques for fabricating objects including amorphous metal.

BACKGROUND

Metallic glasses, also known as amorphous metals, have generated much interest for their potential as robust engineering materials. Metallic glasses are characterized by their disordered atomic-scale structure in spite of their metallic constituent elements—i.e. whereas conventional metallic materials typically possess a highly ordered atomic structure, metallic glasses are characterized by their disordered atomic structure. Notably, metallic glasses typically possess a number of useful material properties that can allow them to be implemented as highly effective engineering materials. For example, metallic glasses are generally much harder than conventional metals, and are generally tougher than ceramic materials. They are also relatively corrosion resistant, and, unlike conventional glass, they can have good electrical conductivity.

Nonetheless, the manufacture and implementation of metallic glasses present challenges that limit their viability as engineering materials. In particular, metallic glasses are typically formed by raising a metallic glass above its melting temperature, and rapidly cooling the melt to solidify it in a way such that its crystallization is avoided, thereby forming the metallic glass. The first metallic glasses required extraordinary cooling rates, e.g. on the order of $10^6$ K/s, to avoid crystallization, and were thereby limited in the thickness with which they could be formed because thicker parts could not be cooled as quickly. Indeed, because of this limitation in thickness, metallic glasses were initially largely limited to applications that involved coatings. Since then, however, metallic glass compositions that have lower critical cooling rates have been developed, which can thereby form metallic glasses at much lower cooling rates, and can therefore be made to be much thicker (e.g. greater than 1 mm), for example via die casting. These thicker metallic glasses are known as 'bulk metallic glasses' ("BMGs").

SUMMARY OF THE INVENTION

Systems and methods in accordance with embodiments of the invention fabricate objects including amorphous metals using techniques akin to additive manufacturing. In one embodiment, a method of fabricating an object that includes an amorphous metal includes: applying a first layer of molten metallic alloy to a surface; cooling the first layer of molten metallic alloy such that it solidifies and thereby forms a first layer including amorphous metal; subsequently applying at least one layer of molten metallic alloy onto a layer including amorphous metal; cooling each subsequently applied layer of molten metallic alloy such that it solidifies and thereby forms a layer including amorphous metal prior to the application of any adjacent layer of molten metallic alloy; where the aggregate of the solidified layers including amorphous metal forms a desired shape in the object to be fabricated; and removing at least the first layer including amorphous metal from the surface.

In another embodiment, a plurality of layers including amorphous metal is removed from the surface.

In yet another embodiment, all of the applied layers of molten metallic alloy that have solidified into layers including amorphous metal are removed from the surface.

In still another embodiment, at least one layer of molten metallic alloy is applied using a spraying technique.

In still yet another embodiment, at least one layer of molten metallic alloy is applied using a thermal spraying technique.

In a further embodiment, at least one layer of molten metallic alloy is applied using a technique that is one of: high velocity oxy-fuel spraying, plasma spraying, wire arc spraying, and mixtures thereof.

In a yet further embodiment, the feedstock for the spraying technique uses feedstock that is one of: wire, powder, a molten pool of the metallic alloy composition being applied, a molten pool of the constituent elements of the metallic alloy composition being applied, and mixtures thereof.

In a still further embodiment, the spraying technique utilizes a computer-controlled apparatus.

In a still yet further embodiment, multiple spraying apparatuses are used to apply layers of molten metallic alloy.

In another embodiment, at least one layer of molten metallic alloy has a composition that has a critical casting thickness of greater than approximately 1 mm.

In yet another embodiment, at least one layer of molten metallic alloy has a composition that has a critical casting thickness of less than approximately 100 μm.

In still another embodiment, at least one layer of applied molten metallic alloy has a different composition than at least one other layer of applied molten metallic alloy.

In still yet another embodiment, at least one layer of applied molten metallic alloy has a thickness of between approximately 10 nanometers and approximately 100 micrometers.

In a further embodiment, at least one layer of molten metallic alloy includes a composition that is one of: a zirconium based composition, a nickel based composition, a cobalt based composition, an iron based composition, a palladium based composition, a platinum based composition, a gold based composition, a copper based composition, a tungsten based composition, a niobium based composition, a hafnium based composition, an aluminum based composition, a composition that includes at least 50% (atomic) of a mixture of Zr—Ti—Be, a composition that includes at least 50% (atomic) of a mixture of Zr—Be, a composition that includes at least 50% (atomic) of a mixture of Cu—Zr, a composition that includes at least 50% (atomic) of a mixture of Cu—Zr—Al, a composition that includes at least 50% (atomic) of a mixture of Fe—Ni, a composition that includes at least 50% (atomic) of a mixture of Ni—P, a composition that includes at least 50% (atomic) of a mixture of Fe—Ni—B, a composition that includes at least 50%

(atomic) of a mixture of Fe—P, a composition that includes at least 50% (atomic) of a mixture of Pd—P, a composition that includes at least 50% (atomic) of a mixture of Cu—P, a composition that includes at least 50% (atomic) of a mixture of Al—Y, and a composition that includes at least 50% (atomic) of a mixture of Ni—Nb.

In a yet further embodiment, the layers of molten metallic alloy are cooled such that the fabricated object includes 25% amorphous metal by volume.

In a still further embodiment, the layers of molten metallic alloy are cooled such that the shear modulus of the fabricated object is at least approximately 5% lower than it would be of the part had been fabricated using a casting technique.

In a still yet further embodiment, the layers of molten metallic alloy are cooled such that the fracture toughness of the fabricated object is at least approximately 10% higher than if the object were fabricating using a casting technique.

In another embodiment, the surface is one of: a flat surface, a curved surface, and a surface having a periodic cellular structure.

In yet another embodiment, the surface has axial symmetry and the layer of molten metallic alloy is applied to the surface while it is being rotated about its axis of symmetry.

In still another embodiment, the surface includes one of: metal, carbide, graphite, ceramic, glass, plastic, and mixtures thereof.

In still yet another embodiment, the surface includes a coating of graphite powder.

In a further embodiment, the solidified layers including amorphous metal are removed from the surface by one of: mechanically removing the solidified layers including amorphous metal from the surface, dissolving the surface, melting the surface, and mixtures thereof.

In a yet further embodiment, the fabricated object has a thickness of between approximately 0.1 mm and approximately 25 mm.

In a still further embodiment, the fabricated object has a thickness that is greater than the critical casting thickness of any of the compositions of the applied layers of molten metallic alloy.

In a still yet further embodiment, the fabricated object is sheet metal.

In another embodiment, the sheet metal has a thickness of between approximately 0.1 mm and approximately 2 mm.

In yet another embodiment, the method further includes subjecting the solidified layers including amorphous metal to one of: a rolling process; an embossing process; a stamping process; a heating process; a chemical etching process; and mixtures thereof.

In still another embodiment, the solidified layers including amorphous metal are subjected to a rolling process that removes undesired imperfections in the solidified layers including amorphous metal.

In still yet another embodiment: an additional surface is used to define the shape of the fabricated object; the fabricated object has extrusion symmetry; and the fabricated object is removed from the additional surface using a pressing technique.

In a further embodiment, a method of fabricating an object that includes an amorphous metal includes: applying a first layer of molten metallic alloy to a surface; cooling the first layer of molten metallic alloy such that it solidifies and thereby forms a first layer including amorphous metal; subsequently applying at least one layer of molten metallic alloy onto a layer including amorphous metal; and cooling each subsequently applied layer of molten metallic alloy such that it solidifies and thereby forms a layer including amorphous metal prior to the application of any adjacent layer of molten metallic alloy; where at least two applied layers of molten metallic alloy are not coextensive in shape; and where the aggregate of the solidified layers including amorphous metal forms a desired shape in the object to be fabricated.

BRIEF DESCRIPTION OF THE DRAWINGS

FIGS. 11A-11B illustrate the fabrication of an object including amorphous metal using a surface having a periodic cellular structure in accordance with embodiments of the invention.

DETAILED DESCRIPTION

Figure 1:
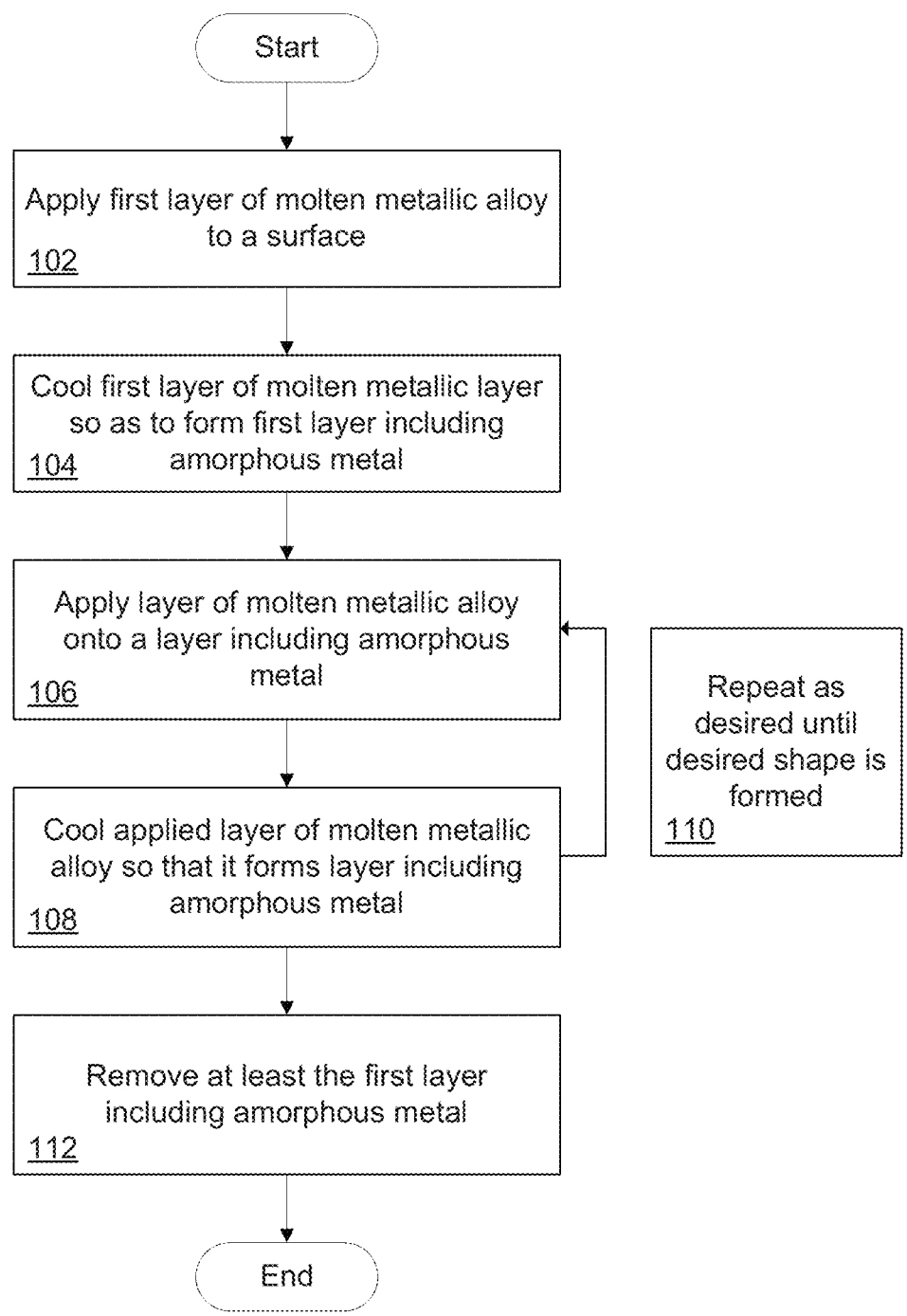
FIG. 1 illustrates a process for fabricating an object that includes amorphous metal in accordance with embodiments of the invention.

Turning now to the drawings, systems and methods for fabricating objects including amorphous metal are illustrated. In many embodiments, a method of fabricating an object that includes amorphous metal involves applying successive layers of molten metallic alloy into the shape of an object to be formed, allowing each applied layer to solidify into a layer including amorphous metal prior to the application of a subsequent adjacent layer of molten metallic alloy. In numerous embodiments, cooling mechanisms are used to facilitate the cooling of the molten metallic layers so that they form amorphous metal. In a number of embodiments molten metallic alloy is sprayed into mold cavities which help define the shape of the object to be formed.

While amorphous metal compositions have been discovered that can allow the alloys to be cast into parts having a thickness greater than 1 mm (bulk metallic glasses), casting these particular compositions generally cannot be used to create an arbitrarily thick object. Instead, the geometries of cast objects are effectively limited by the composition's critical cooling rate, i.e. the cooling rate above which the melt must be cooled in order for it to form amorphous metal. As can be appreciated, thicker geometries have lower cooling rates. Accordingly, the geometries of cast bulk metallic glass objects are generally limited to several centimeters based upon the particular metallic alloy's critical cooling rate. The maximum thickness that a given metallic alloy composition can be cast using conventional casting techniques and still form amorphous metal across its width is known as the critical casting thickness.

Importantly, the toughness of the cast amorphous metal is also a function of the cooling rate by which it was formed. Demetriou et al. demonstrate this phenomenon in *Applied Physics Letters* 95, 041907 (2009), "Glassy steel optimized for glass-forming ability and toughness." The disclosure of *Applied Physics Letters* 95, 041907 (2009) is hereby incorporated by reference. In general, Demetriou et al. demonstrate that the toughness of a cast part will tend to linearly decrease as a function of its thickness.

Harmon et al. explain the underlying mechanisms for this phenomenon in *Physical Review Letters* 99, 135502 (2007), "Anelastic to Plastic Transition in Metallic Glass-Forming Liquids"; generally, Harmon et al. explain that the toughness of an amorphous metal is related to its internal energy, and increasing the cooling rate used in the formation of the amorphous metal can increase its internal energy. Thus, as thicker castings have lower cooling rates, parts that are cast thicker will tend to have a correspondingly lower toughness. And it follows that increasing the cooling rate in forming an amorphous metal can increase its toughness. By extension, the fracture toughness can also increase with an increased cooling rate. Note also that when parts are cast, the cooling rate of the casting can vary throughout the casting (e.g. the cooling rate in the middle of the casting can be noticeably lower than that at the surface of the casting) and thereby cause the toughness to vary throughout the casting. In many instances, this can be an undesirable outcome.

Bear in mind that the toughness of a material can correspond with any of a variety of its material properties. For example, that the toughness is correlated with its shear modulus is touched on in Garret et al., in *Applied Physics Letters* 101, 241913 (2012), "Effect of Microalloying on the toughness of metallic glasses." The disclosure of *Applied Physics Letters* 101, 241913 (2012) is hereby incorporated by reference. Generally, lower shear moduli correspond with higher toughness values.

Thus, in many embodiments, manufacturing techniques that resemble additive manufacturing techniques are implemented that can allow the fabrication of an object that includes amorphous metal and is not limited by a critical casting thickness. Moreover, these fabrication techniques can be used to more precisely govern the cooling rate, and consequently the resulting toughness, of the fabricated object. In this way, the above-described shortcomings of casting objects so that they include amorphous metals can be overcome. In many embodiments, layers of molten metallic glass are iteratively applied to a surface, where each applied layer is cooled so that it forms a layer including amorphous metal prior to the deposition of any adjacent layer of molten metallic alloy onto it; the layers are deposited in a pattern such that when they solidify, the layers in aggregate form the shape of the desired object. These processes are now discussed in greater detail below.

Processes for Fabricating Objects Including Amorphous Metal Using Techniques Akin to Additive Manufacturing In many embodiments, a method of fabricating an object that includes amorphous metal involves applying successive layers of molten metallic alloy into the shape of an object to be formed, allowing each applied layer to solidify into a layer including amorphous metal prior to the application of a subsequent adjacent layer of molten metallic alloy. In many embodiments the layers of molten metallic alloy are applied using a spraying technique. In a number of embodiments, a distinct cooling mechanism is used to facilitate the cooling of the applied layers of molten metallic alloy. In several embodiments, the layers are sprayed onto a surface, and subsequently removed from the surface in aggregate. In some embodiments, the surface is configured to facilitate the removal of layers including amorphous metal from it.

FIG. 1 illustrates a process for fabricating an object that includes amorphous metal by applying successive layers of molten metallic alloy onto a surface, and subsequently removing the solidified layers that include amorphous metal in accordance with embodiments of the invention. In particular, the process 100 includes applying 102 a first layer of molten metallic alloy to a surface. The layer of molten metallic alloy can be applied using any suitable technique, including via thermal spraying. The layers can be of any appropriate thickness. In many embodiments, the applied layers have a thickness of between approximately 10 nm and approximately 100 μm. Of course, the layers can be applied in any suitable thickness. Moreover, the layer can be applied using a computer-controlled apparatus. In this way, the layer can be applied in a precise and/or accurate pattern. Further, in many embodiments, a layer of molten metallic alloy is applied under conditions designed to reduce occurrences of unwanted oxidation. Note that metallic alloy compositions that include titanium and/or zirconium may be particularly susceptible to unwanted oxidation. Thus, in some embodiments, a layer of molten metallic alloy is applied in at least a partial vacuum. In many embodiments, layers of molten metallic alloy are applied in an atmosphere of inert gas. In this way, the chances of unwanted oxidation can be reduced.

Note that any molten metallic alloy that is capable of forming amorphous metal may be used. For example, in many embodiments, the molten metallic alloy has a composition based on one of: zirconium, titanium, nickel, cobalt, iron, palladium, platinum, gold, copper, tungsten, niobium, hafnium, aluminum, and mixtures thereof. The term 'based on' can be understood as follows: when a composition is 'based on' an element, that element is the most abundant within the given composition. In a number of embodiments, the molten metallic alloy composition includes at least 50% (atomic) of one of the following combinations: Zr—Ti—Be, Zr—Be, Cu—Zr, Cu—Zr—Al, Fe—Ni, Ni—P, Fe—Ni—B, Fe—P, Pd—P, Cu—P, Al—Y, and Ni—Nb (note that the relative atomic ratios of the elements are not listed—they can be present in any relative amount in accordance with embodiments of the invention). Although several examples are given, it should be clear that any suitable metallic alloy composition that can be made to form an amorphous metal can be used in accordance with embodiments of the invention. Note that the metallic alloy compositions that are used do not have to be bulk metallic glass compositions because the techniques described herein largely rely on cooling thinly deposited layers of molten metallic alloys—thinly formed geometries cool much more rapidly than thick ones, and can thereby form amorphous metal much more easily. In other words, the metallic alloys used do not have to have relatively high critical cooling rates. As a result, whereas conventional techniques (e.g. casting) for forming relatively larger objects were largely limited to implementing bulk metallic glass compositions, the techniques described herein are generally not so limited.

Figure 2:
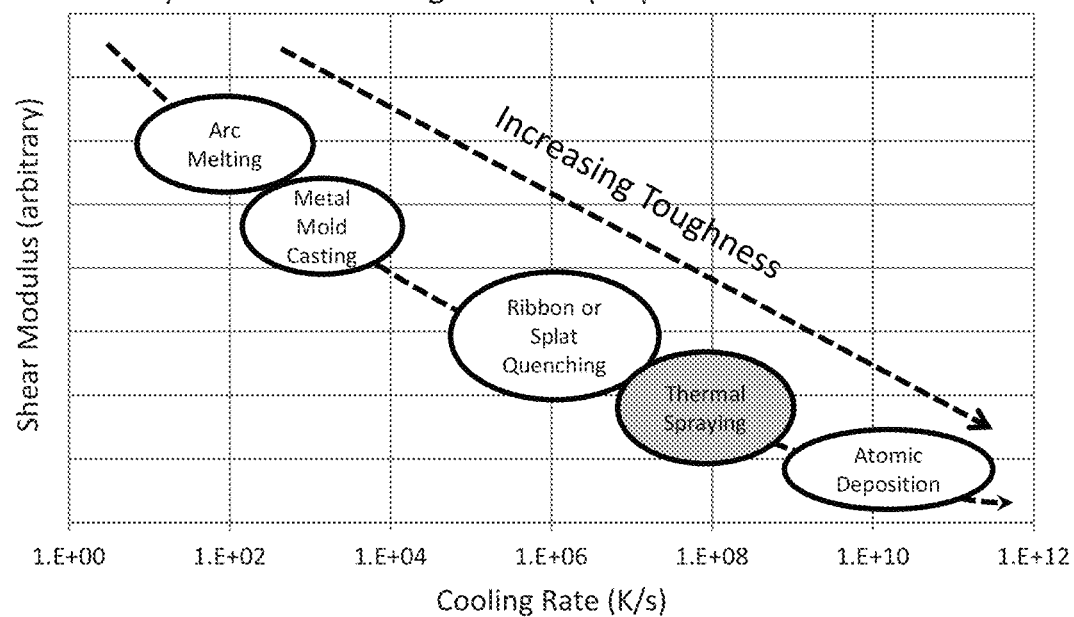
FIG. 2 illustrates a chart comparing the impact of various techniques for forming amorphous metal.

FIG. 2 depicts how using thermal spraying in forming amorphous metal can allow for a comparatively high cooling rate relative to other processes for forming amorphous metal. From FIG. 2, it is seen that thermal spraying techniques can allow for cooling rates on the order of $10^8$ K/s. As discussed above and illustrated in FIG. 2, the high cooling rate can result in a relatively lower shear modulus, which is indicative of increased toughness. Note that thermal spraying techniques are further advantageous insofar as they can be used to create objects having a broad range of thicknesses in accordance with the techniques described herein. By contrast: arc melting and metal mold casting are typically limited to creating objects having thicknesses on the order of millimeters to centimeters; ribbon and splat quenching are typically suited to create objects having a thickness from 10 μm to 100 μm; and atomic deposition is typically suited for creating objects that have a thickness on the order of a several nanometers.

Accordingly, in many embodiments, thermal spraying techniques are utilized to apply layers of molten metallic alloy. Any suitable spraying technique can be incorporated in accordance with embodiments of the invention. In many embodiments, spraying techniques that involve heating, atomizing, and spraying are used. Generally, spraying techniques involve melting a feedstock metallic alloy composition, and thereafter spraying the melt onto an applied surface. The feedstock can be in the form of wire or it can be in the form of powder, for instance. In some embodiments, the feedstock is a molten pool of the final desired composition for the applied molten metallic alloy, or a molten pool of individual elements that make up the molten metallic alloy.

Tables 1 and 2 list several thermal spray techniques, along with their characteristics, that may be incorporated in fabricating an object in accordance with embodiments of the invention.

TABLE 1

Thermal Spray Techniques and Characteristics

|  | Gas Flow ($m^3$/h) | Flame or exit plasma temperature (° C.) | Particle Impact Velocity (m/s) | Relative Adhesive Strength (a) | Corrosive Strength |
|---|---|---|---|---|---|
| Flame Powder | 11 | 2200 | 30 | 3 | Low |
| Flame Wire | 71 | 2800 | 180 | 4 | Medium |
| High-Velocity Oxy-fuel (HVOF) | 28-57 | 3100 | 610-1060 | 8 | Very High |
| Deformation Gun | 11 | 3900 | 910 | 8 | Very High |
| Wire Arc | 71 | 5500 | 240 | 6 | High |
| Conventional Plasma | 4.2 | 5500 | 240 | 6 | High |
| High-energy Plasma | 17-28 | 8300 | 240-1220 | 8 | Very High |
| Vacuum plasma | 8.4 | 8300 | 240-610 | 9 | Very High |

TABLE 2

Thermal Spray Techniques and Characteristics (Continued)

|  | Oxide Content (%) | Relative Process Cost (a) | Maximum Spray Rate (kg/hr) | Power (kW) | Energy Required (kW/kg) |
|---|---|---|---|---|---|
| Flame Powder | 6 | 3 | 7 | 25-75 | 11-22 |
| Flame Wire | 4 | 3 | 9 | 50-100 | 11-22 |
| High-Velocity Oxy-fuel (HVOF) | 0.2 | 5 | 14 | 100-270 | 22-200 |
| Deformation Gun | 0.1 | 10 | 1 | 100-270 | 220 |
| Wire Arc | 0.5-3 | 1 | 16 | 4-6 | 0.2-0.4 |
| Conventional Plasma | 0.5-1 | 5 | 5 | 30-80 | 13-22 |
| High-energy Plasma | 0.1 | 4 | 23 | 100-250 | 9-13 |
| Vacuum plasma | (ppm levels) | 10 | 10 | 50-100 | 11-22 |

The data in table 1 is obtained from *Handbook of Thermal Spray Technology* (#06994G), "Introduction to Thermal Spray Processing," published by ASM International. The disclosure of *Handbook of Thermal Spray Technology* (#06994G), "Introduction to Thermal Spray Processing," is incorporated by reference herein. In many embodiments, HVOF is used to apply layers of molten metallic glass, as HVOF techniques can be particularly beneficial in this application. For example, HVOF techniques are capable of delivering molten metallic alloy at relatively high rates; this can enable objects to be fabricated much more quickly. Although not listed in Tables 1 or 2, cold-spraying techniques may also be used in accordance with embodiments of the invention. Indeed, any suitable spraying technique may be used to apply a layer of molten metallic alloy in accordance with embodiments of the invention. More generally, any suitable technique for applying a layer of molten metallic alloy may be incorporated.

Figures 3A, 3B, 3C:
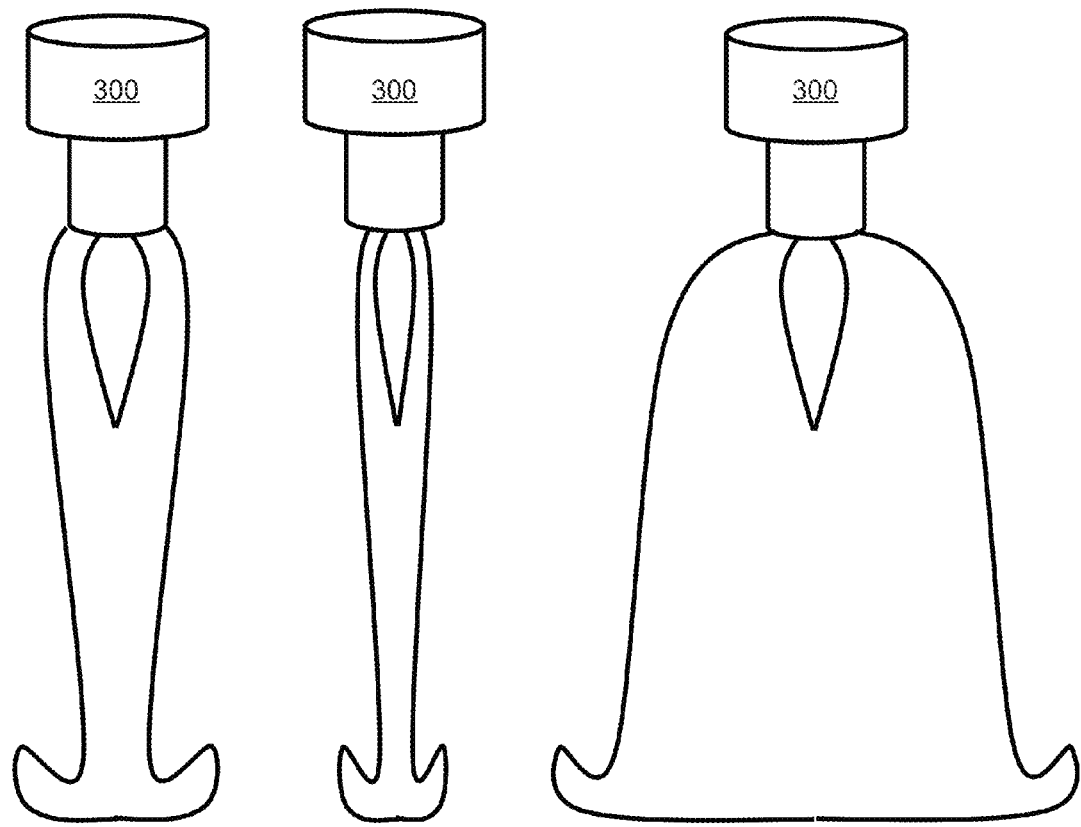
FIGS. 3A-3C illustrate how a spray nozzle may be incorporated in the fabrication of an object including amorphous metal to control the application of layers of molten metallic alloy in accordance with embodiments of the invention.

In many embodiments, where spraying is used to apply layers of molten metallic glass, a spray nozzle is utilized that can adjust the surface area by which the molten metallic alloy is deposited. For example, FIGS. 3A-3C illustrate the adjustment of the nozzle of a spraying mechanism to control the distribution of the molten metallic alloy. In particular, FIG. 3A depicts a nozzle 300 that is spraying molten metallic alloy such that a layer of molten metallic alloy is applied having a baseline surface area. FIG. 3B illustrates that the nozzle 300 is adjusted so as to make the spraying more narrow thereby resulting in the application of a layer of molten metallic alloy having a smaller surface area. Conversely, FIG. 3C illustrates that the nozzle 300 has been adjusted to broaden the spraying distribution thereby causing the application of a layer of molten metallic alloy having a relatively larger surface area. In other words, FIGS. 3A-3C illustrate that the 'spot size' of the spraying can be controlled in accordance with embodiments of the invention. In many embodiments the spot size has a diameter between approximately 1 mm and approximately 100 mm. In this way, the pattern of the layer of the applied molten layer can be better controlled.

Referring back to FIG. 1, the process of fabricating an object 100 further includes cooling 104 the first layer of molten metallic alloy so that it forms a first layer including amorphous metal. Thus, in many embodiments, the first layer of molten metallic alloy is cooled at a rate that is above its critical cooling rate so that it forms a layer including amorphous metal. In many embodiments, the layer solidifies and thereby forms a layer including amorphous metal. In some embodiments, the layer of molten metallic alloy is cooled so that it forms amorphous metal throughout. In a number of embodiments, the only part of the cooled layer forms amorphous metal. In some embodiments, the solidified layer includes 25% by volume of amorphous metal. Although it should be clear that amorphous metal can be present in any amount in accordance with embodiments of the invention. The remainder of the cooled solidified layer can be in any phase—for example it can be in a crystalline phase.

Figure 4:
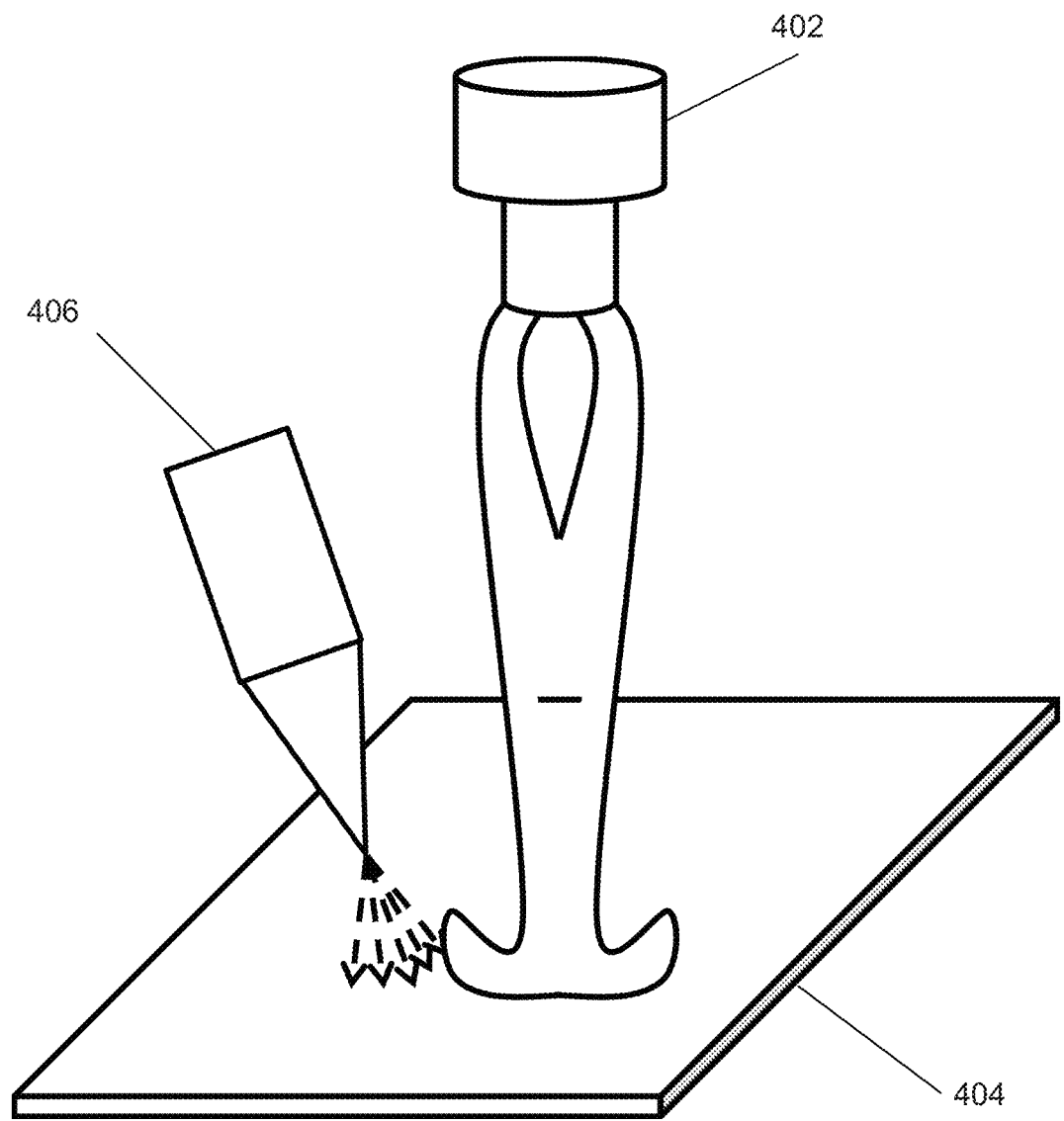
FIG. 4 illustrates using a cooling jet to facilitate the cooling of molten metallic alloy in accordance with embodiments of the invention.

The cooling 104 of the layer can be achieved by any suitable means. In a number of embodiments, the first layer of molten metallic alloy is allowed to cool by conduction. In some embodiments, the first layer of molten metallic alloy is cooled by convection. In several embodiments, the first layer of molten metallic alloy is subjected to an airflow that has a temperature lower than that of the first layer, and thereby cooled. In many embodiments, a separate cooling mechanism is employed to cool 104 the first layer of molten metallic alloy. For example, in some embodiments, cooling jets are implemented. FIG. 4 illustrates the cooling of a molten metallic alloy layer using a cooling jet. In particular, FIG. 4 illustrates a spraying mechanism 402 that is applying a layer of molten metallic alloy 404, and using a cooling jet 406 to facilitate the cooling of the molten metallic alloy layer 404. Using a cooling jet can expedite the cooling of the molten metallic alloy, and can additionally allow the cooling rate of the metallic alloy to be controlled with greater accuracy. Thus, in many embodiments, a cooling rate is imposed onto a molten metallic alloy layer in order to establish a desired toughness value for the resulting layer of amorphous metal. Note that in many embodiments, it is desirable to form an object that does not have a uniform toughness throughout it. Accordingly, in many embodiments, when subsequent layers of molten metallic alloy are applied, they are each not necessarily cooled at the same rate, bearing in mind that the cooling rate of a particular layer can help determine its toughness.

Referring back to FIG. 1, the process for fabricating an object 100 further includes applying 106 a layer of molten metallic alloy onto a layer including amorphous metal. The layer including amorphous metal can be the above-mentioned first layer including amorphous metal. The applying 106 can be achieved using any suitable technique including those discussed above with respect to applying 102 a first layer of molten metallic alloy. Additionally, it should be noted that the layer molten metallic alloy applied 106 can be of a different composition than a layer previously applied. In this way the object being fabricated can include amorphous metal of a plurality of compositions. The process 100 further includes cooling 108 this applied layer so that it forms a layer including amorphous metal. In many embodiments, the layer solidifies and thereby forms a layer including amorphous metal. As before, the amorphous metal can be present in any suitable amount in accordance with embodiments of the invention. Again, any suitable cooling technique may be implemented including any of the previously mentioned cooling methods discussed above with respect to cooling 108 the first layer of molten metallic alloy. Also, as mentioned previously, subsequently applied layers of molten metallic alloy do not have to be cooled at the same cooling rate. The application 106 and cooling 108 of layers of molten metallic alloy is repeated 110 so as to form a desired shape. For instance, the layers can be deposited in particular patterns so as to form the desired shape. In other words, the applied layers can be thought of as cross-sections of the desired shape (within tolerance). In many embodiments, the layers are deposited so as to form substantially the desired shape; to the extent that the formed layers including amorphous metal deviate from the desired shape, they can be post-processed to remove any undesired imperfections. As can be appreciated, these iterative processes resemble conventional additive manufacturing techniques. Accordingly, techniques that are conventionally used in additive manufacturing may be incorporated in accordance with embodiments of the invention. Thus, for example, where a spraying mechanism is used in applying a layer of molten metallic alloy, the spraying mechanism can be moved relative to the surface (and any previously deposited and cooled layers) so as to control the shape of the deposited layer. In some embodiments, the direction of the spraying is controlled so as to form the shape of the layer to be deposited. Also, as can be appreciated, where a spray nozzle that can control the spraying distribution of the molten metallic alloy is used, this too can help control the shape of the deposited layer. In this way, the shape of the object can be controlled and made to develop as desired. Additionally, supporting structures may be deposited in conjunction with molten metallic layers to facilitate the development of a desired shape. The solidified layers can later be removed from any supporting structures. Of course, any of a variety of techniques conventionally used in additive manufacturing may be implemented in accordance with embodiments with the invention.

The process for fabricating an object 100 further includes removing 112 at least the first solidified layer including amorphous metal. In a number of embodiments, a plurality of solidified layers including amorphous metal is removed 112. In many embodiments, all of the solidified layers including amorphous metal that were applied as molten metallic alloy and cooled are removed from the surface. Any suitable technique for removing the layers can be used. For instance, in some embodiments solidified layers are removed mechanically (e.g. by excising) from the surface. In a number of embodiments, the surface is made to dissolve, and solidified layers are thereby removed from the surface. In a number of embodiments, the surface is melted and solidified layers are thereby removed from it. As can be appreciated, any suitable technique for removing layers including amorphous metal from the surface can be implemented.

Figure 5A:
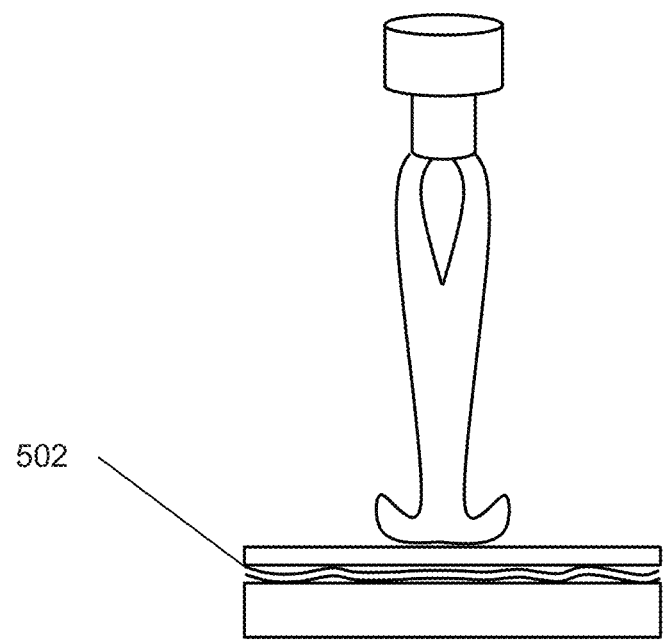
FIGS. 5A-5B illustrate the implementation of a coating layer that facilitates the removal of a formed object from the surface upon which it was formed in accordance with embodiments of the invention.
Figure 5B:
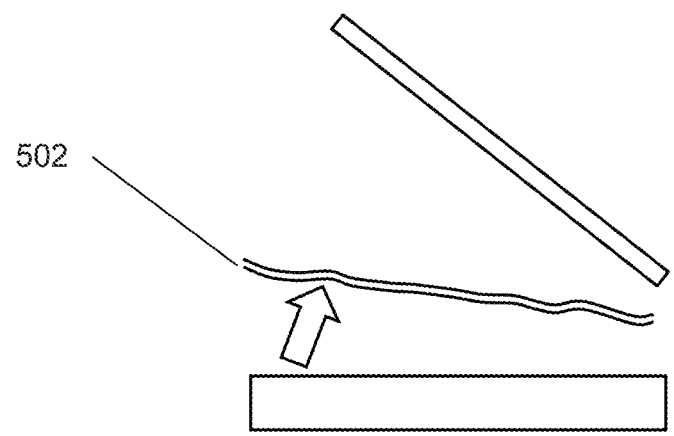

In many embodiments, a surface is used that is configured to facilitate the removal of solidified layers including amorphous metal. For example, in many embodiments, the surface includes a 'non-stick coating' that is a layer that does not adhere well to layers including amorphous. For example, in many embodiments, the surface includes graphite powder that can promote the removal of layers including amorphous metal. FIGS. 5A and 5B illustrate the inclusion of a layer that is meant to facilitate the removal of layers including amorphous metal from the surface. In particular, FIG. 5A illustrates the application of molten metallic alloy onto a surface including a 'non-stick coating' 502, and FIG. 5B illustrates how the non-stick coating 502 facilitates the removal of the solidified layers. Of course, it should be understood that the surface can incorporate any of a variety of materials that facilitate the removal of layers including amorphous metal, and not just graphite powder, in accordance with embodiments of the invention.

In many embodiments, the surface inherently weakly adheres to the layers including amorphous metal, and thereby facilitates the removal of solidified layers including amorphous metal from it. For example, in many embodiments, the surface constitutes copper which is known to have poor adhesion. It should of course be understood that any of a variety of materials inherently having poor adhesive properties can be used that promote the removal of the aggregate of solidified layers in accordance with embodiments of the invention. In many embodiments, the surface includes one of: metal, carbide, graphite, ceramic, glass, plastic, and mixtures thereof. More generally, any suitable techniques can be implemented that promote the removal of layers including amorphous metal from the surface can be implemented.

Figure 6A:
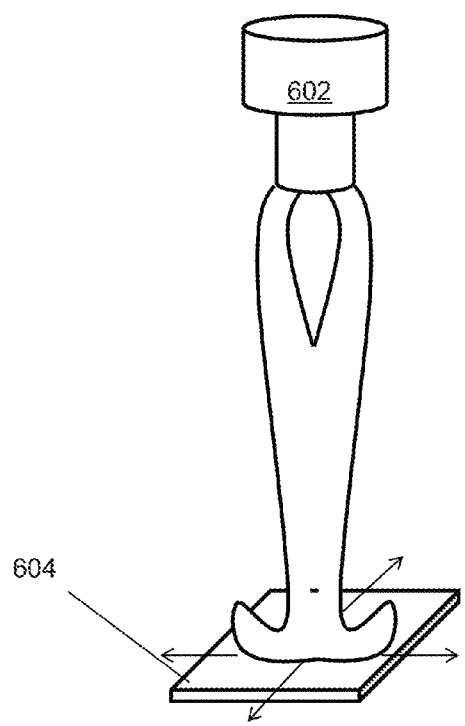
FIGS. 6A-6C illustrate fabricating an object that includes amorphous metal in accordance with embodiments of the invention.
Figure 6B:
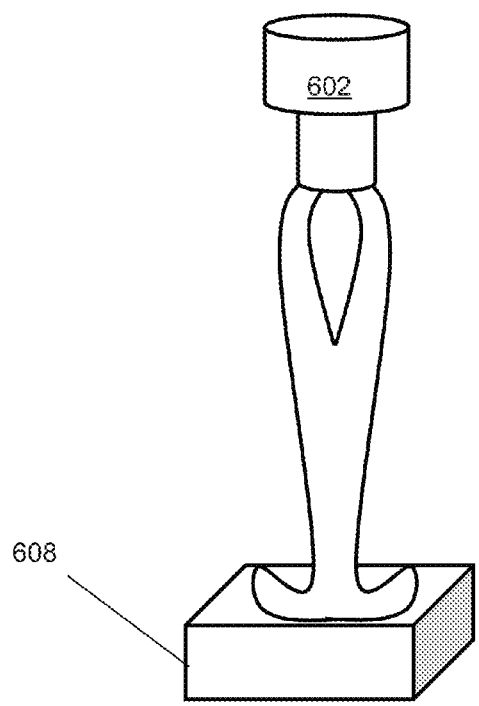
Figure 6C:
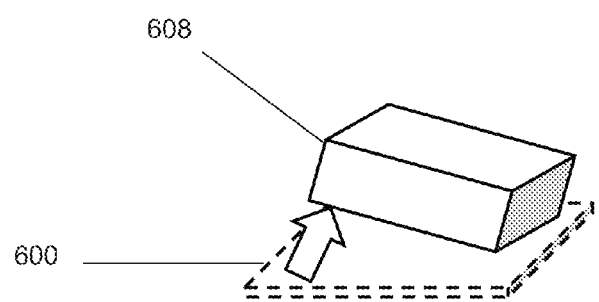

FIGS. 6A-6C illustrate the fabrication of an object according to the process described in FIG. 1 in accordance with embodiments of the invention. In particular, FIG. 6A illustrates the application of a first layer of molten metallic alloy 604 to a surface (not shown) using a spraying apparatus 602. The spraying apparatus 602 is shown as moving relative to the surface in applying the layer 604. In this way, the layer 604 can be applied in a desired pattern. FIG. 6B illustrates that an object having a desired shape 608 has been developed from the applied layers of molten metallic alloy. In the illustrated embodiment, the object 608 is in the shape of a rectangular prism. FIG. 6C illustrates the removal of the object 608 including amorphous metal from the surface from the surface 600. In this way, an object including amorphous metal has been fabricated. Of course it should be understood that any of a variety of object shapes can be fabricated in accordance with embodiments of the invention, not just rectangular prisms. Indeed, the illustrated embodiment reflects a single implementation of the process outlined above with respect to FIG. 1. Accordingly, FIGS. 6A-6C should not be construed as singularly representing the process depicted in FIG. 1 in its entirety. Instead, it should be understood that the process outlined above in FIG. 1 can be implemented in any of a variety of ways.

Figure 7A:
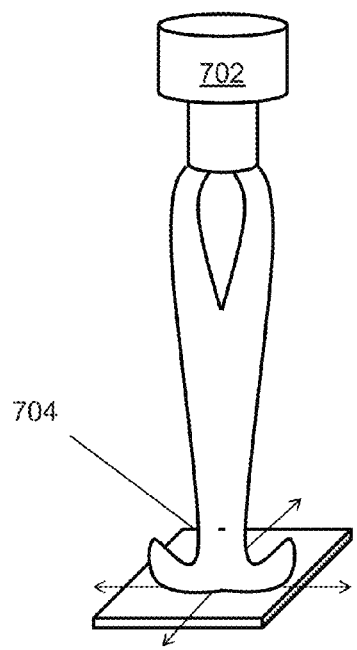
FIGS. 7A-7C illustrate fabricating an object that includes nuanced features in accordance with embodiments of the invention.
Figure 7B:
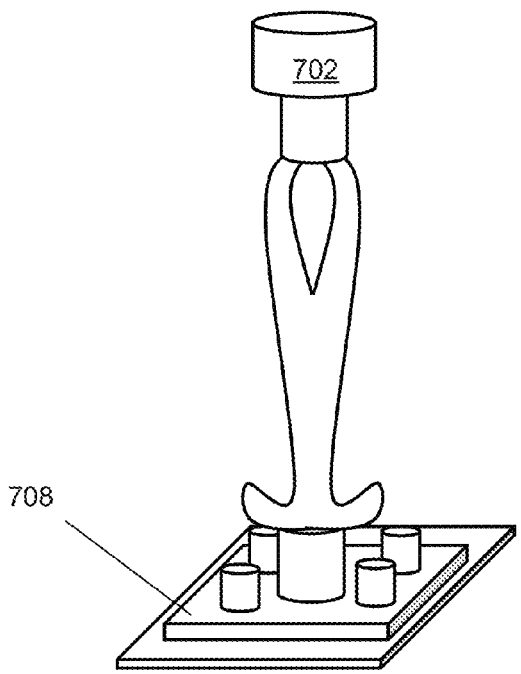
Figure 7C:
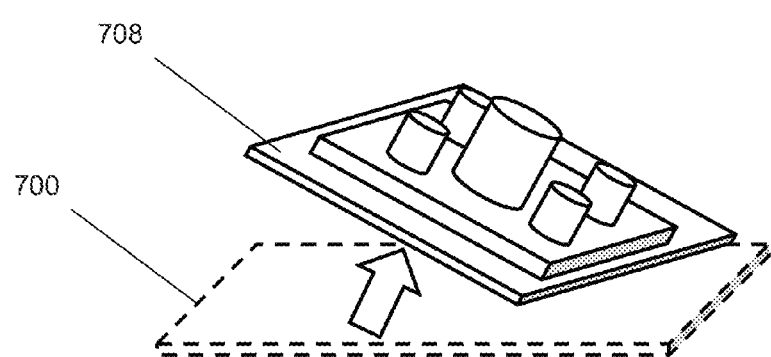

FIGS. 7A-7C illustrate the fabrication of an object having more nuanced features according to the process illustrated in FIG. 1 in accordance with embodiments of the invention. In particular, FIG. 7A illustrates the application of a first layer of molten metallic alloy 704 to a surface (not shown). Again, the spraying apparatus 702 is shown as moving relative to the surface in applying the layer 704. FIG. 7B illustrates that the desired object 708 having more nuanced features has been developed from the layers including amorphous metal. FIG. 7C illustrates the removal of the object 708 from the surface 700. Thus, an object including amorphous metal is achieved.

Figure 8A:
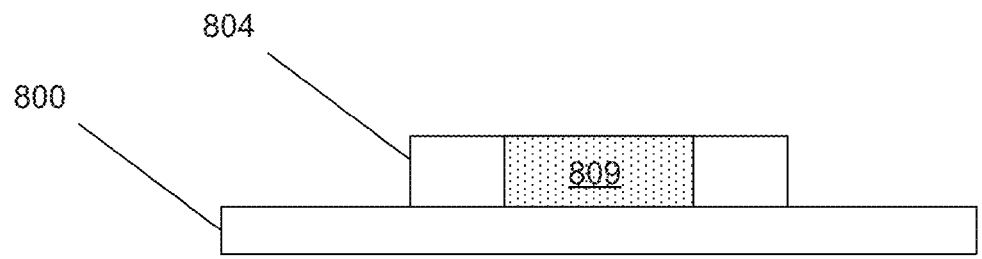
FIGS. 8A-8C illustrate using a supporting structure in forming an object including amorphous metal in accordance with embodiments of the invention.
Figure 8B:
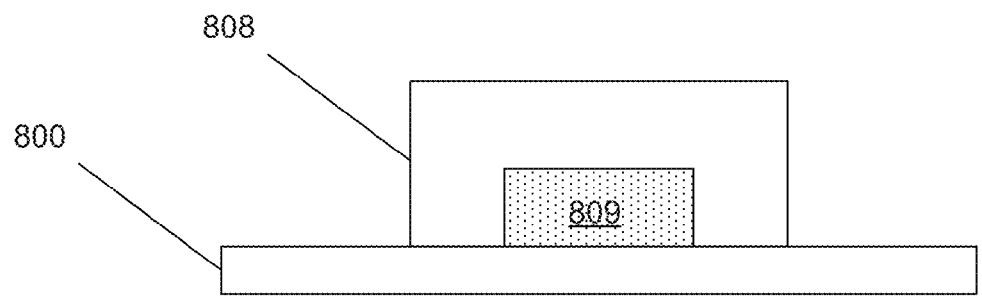
Figure 8C:
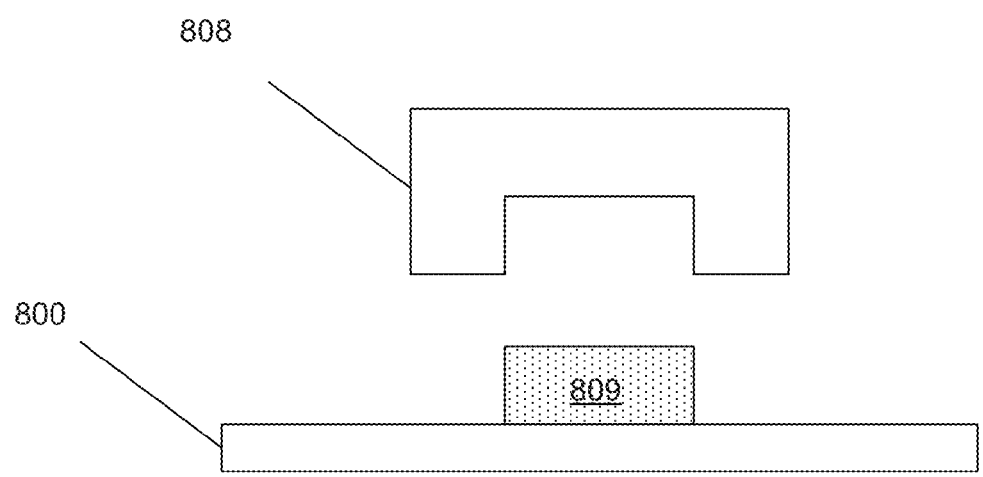

FIGS. 8A-8C illustrate the fabrication of a nuanced object, that incorporates the use of a supporting structure in accordance with embodiments of the invention. In particular, FIG. 8A illustrates the deposition of layers of molten metallic alloy 804 so as to form an object onto a surface 800, as well as the deposition of a supporting structure 809 onto the surface 800. The supporting structure 809 can be applied in any suitable way, and the material of the supporting structure 809 can be any suitable material, including those materials that are typically used as supporting structures in conventional additive manufacturing processes in accordance with embodiments of the invention. Materials that can withstand high temperatures are best suited for the described techniques. FIG. 8B illustrates that supporting structure 809 is used to support the deposition of the subsequent layers of the object 808. FIG. 8C illustrates that the object 808 is thereafter removed from the surface 800 as well as the supporting structure 809. As can be appreciated, the described techniques that resemble additive manufacturing processes can be used to create geometries that are more nuanced than those seen in FIGS. 6A-8C. The objects illustrated in FIGS. 6A-8C are simply meant to be illustrative of the principles of the described techniques, and should not be interpreted as being comprehensive of them.

Figure 9A:
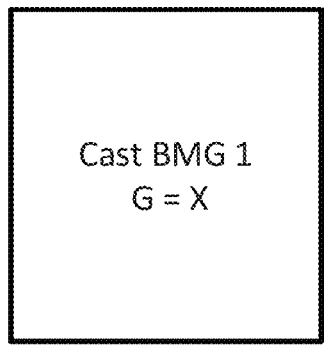
FIGS. 9A-9D illustrate the beneficial impact of fabrication processes in accordance with embodiments of the invention.
Figure 9B:
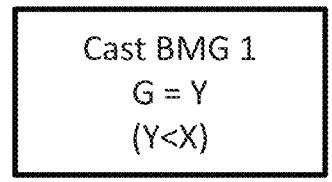
Figure 9C:
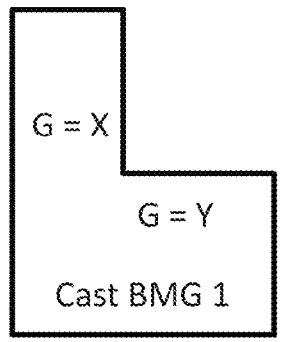
Figure 9D:
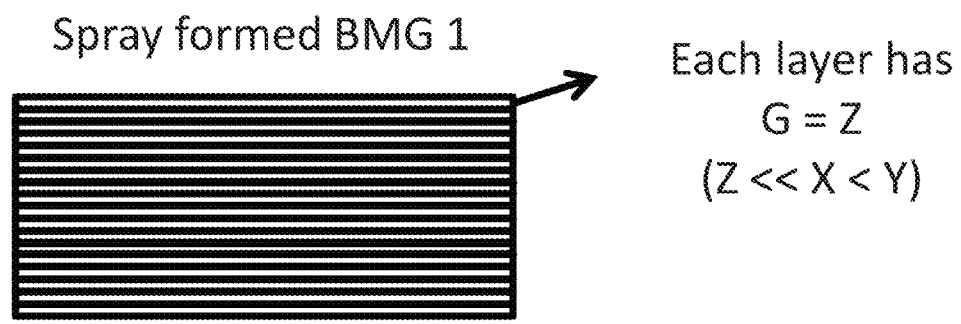

FIGS. 9A-9D illustrate the advantages in materials properties that can result from fabricating objects in accordance with the techniques described herein as opposed to fabricating objects by casting. In particular, FIG. 9A illustrates an object cast from a bulk metallic glass composition having a shear modulus X. FIG. 9B illustrates a thinner object cast from the same metallic alloy having a shear modulus Y. As the object cast in FIG. 9B is thinner, it has a higher cooling rate, and therefore forms an object having a lower shear modulus (higher toughness). FIG. 9C depicts an object having a varying thickness. As a result, the portion of the object that is thinner has a lower shear modulus, while the portion of the cast object that is thicker has a higher shear modulus. Accordingly, the part's toughness varies throughout its cross-section. FIG. 9D illustrates a part formed from the same metallic alloy in accordance with techniques described herein. Because each layer is cooled individually and rapidly, each layer develops a shear modulus that is much lower than those seen in FIGS. 9A-9C. Moreover, the object can be made to have a relatively homogenous toughness throughout its cross section, irrespective of any variation in geometry. However, as mentioned above, the toughness of the object can be made to vary throughout its geometry if desired by varying the cooling rate of the correspondingly applied layer.

As can be appreciated from the above discussion, the described processes can be varied in any number of ways in accordance with embodiments of the invention. In several embodiments, the surface that is used is non-planar, and this aspect is now discussed below.

Fabricating Objects Including Amorphous Alloys Using Non-Planar Surfaces

In many embodiments, layers of molten metallic alloy are deposited onto non-planar surfaces in fabricating objects. In this way, the surfaces can help define the geometry of the fabricated objects. In many embodiments, the surface includes mold cavities that help define the shape of the fabricated object.

Figure 10A:
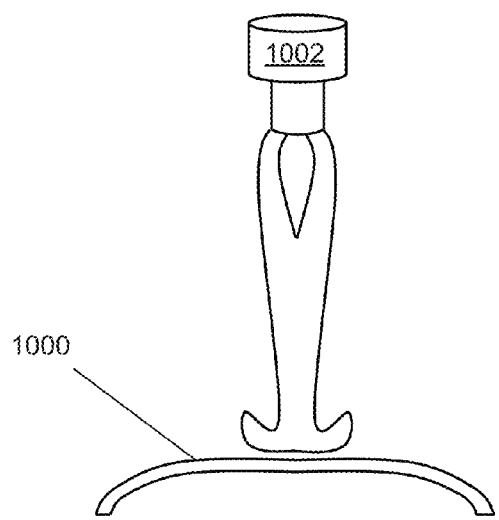
FIGS. 10A-10C illustrate the fabrication of an object including amorphous metal using a curved surface in accordance with embodiments of the invention.
Figure 10B:
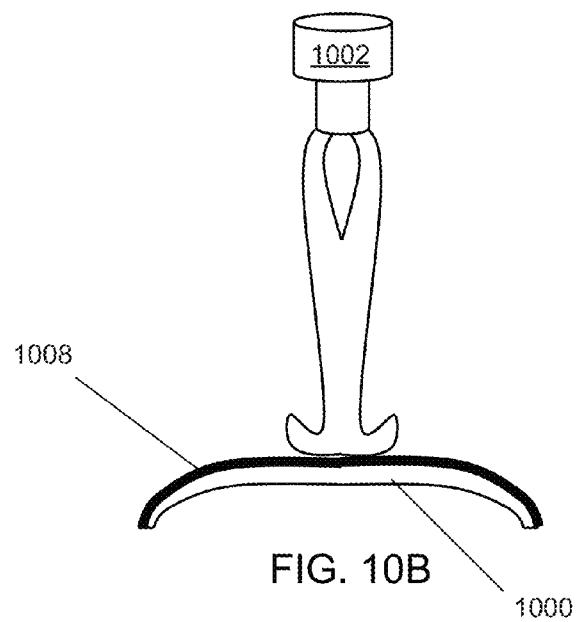
Figure 10C:
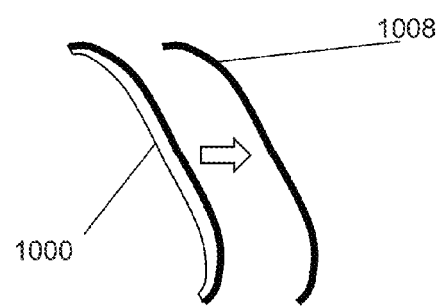

FIGS. 10A-10C illustrate the fabrication of a curved object whereby layers of molten metallic alloy are applied to a curved surface. In particular, FIG. 10A illustrates the application of a first layer of molten metallic alloy to a curved surface 1000 using a spraying apparatus 1002. FIG. 10B illustrates that the object to be formed 1008 traces the shape of curved surface 1000. FIG. 10C illustrates that the object to be formed 1008 is removed from the curved surface 1000. Accordingly, it is seen that a curved surface can be used to help define the shape of a desired object. Indeed, as can be appreciated, a surface having any geometry can be used in accordance with embodiments of the invention. As can be appreciated, the illustrated process is similar to that seen in FIGS. 6A-6C. Accordingly, it should be clear many of the above-described variations are compatible with the processes illustrated in FIGS. 10A-10C, and can be implemented in accordance with embodiments of the invention.

FIGS. 11A-11B illustrate the use of a surface that has a periodic cellular geometry in fabricating an object in accordance with embodiments of the invention. FIGS. 11A-11B are similar to FIGS. 10B-10C, except that a surface having a periodic cellular structure 1100 is used. In this way, an object 1108 can be fabricated that has a geometry that conforms to the periodic cellular geometry of the surface 1100. Again, it should be clear that a surface having any geometry can be incorporated in accordance with embodiments of the invention, and it should be clear that any of the variations described above may also be implemented in accordance with embodiments of the invention.

Figure 12A:
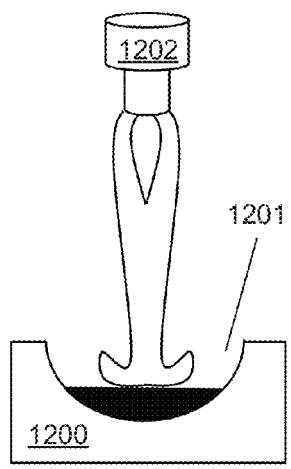
FIGS. 12A-12C illustrate fabricating an object including amorphous metal using a surface including a mold cavity in accordance with embodiments of the invention.
Figure 12B:
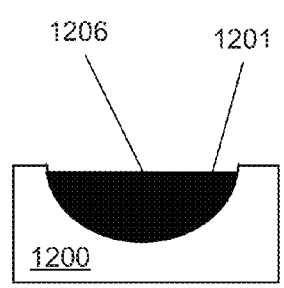
Figure 12C:
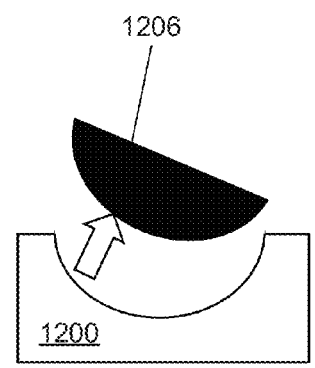

In many embodiments, a surface that includes mold cavities is used in the fabrication of an object in accordance with embodiments of the invention. FIGS. 12A-12C illustrate the fabrication of an object including amorphous metal using a surface that includes a mold cavity in accordance with embodiments of the invention. In particular, FIGS. 12A-12C are similar to those seen with respect to FIGS. 10A-10C, except that the surface 1200 includes a mold cavity portion 1201 that is in the shape of a hemisphere. The mold cavity portion helps define the shape of the object to be formed. Thus, FIG. 12A illustrates the application of layers of molten metallic alloy into the mold cavity portion 1201 of the surface 1200 using a spraying apparatus 1202. FIG. 12B illustrates that the object has been formed within, and conforms to, the mold cavity portion of the 1201 of the surface 1200. And FIG. 12C illustrates the removal of the formed object 1206 from the surface 1200. It should of course be clear that a surface including a mold cavity having any suitable geometry can be used in accordance with embodiments of the invention.

Figure 13A:
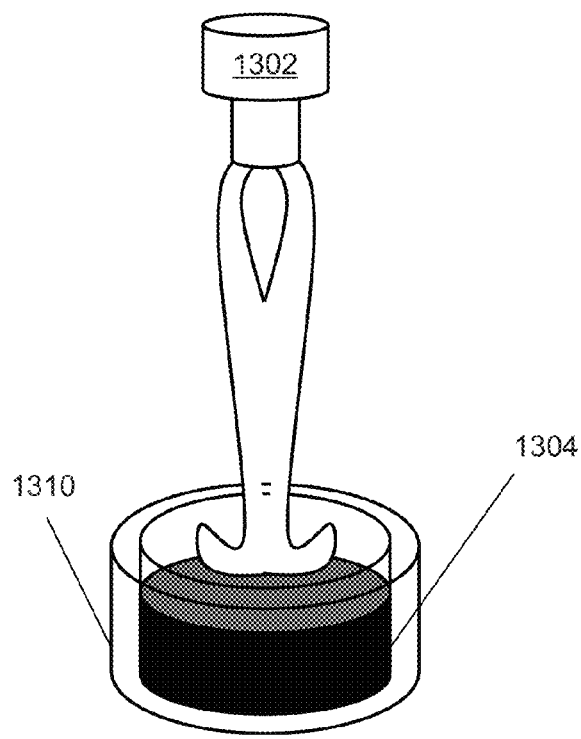
FIGS. 13A-13C illustrate fabricating an object having extrusion symmetry and removing the object from an adjacent surface using a pressing technique in accordance with embodiments of the invention.
Figure 13B:
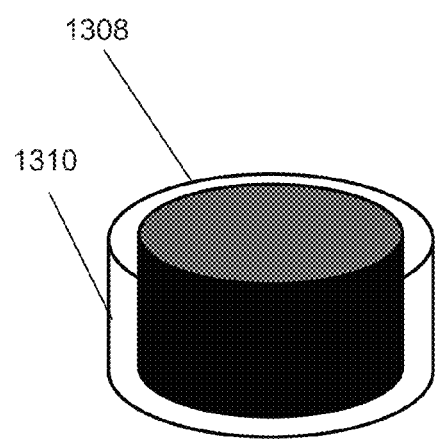
Figure 13C:
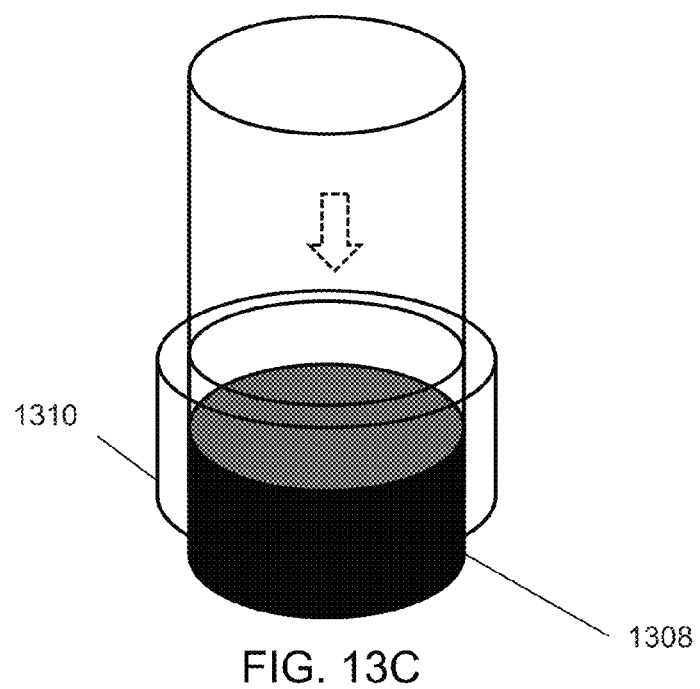

In many embodiments, an additional surface is used to form an object to be fabricated in accordance with embodiments of the invention. FIGS. 13A-13C depict the use of an additional surface that is in the shape of a tube to help define the shape of the object to be formed. In particular, FIG. 13A depicts an additional surface 1310 is used to help shape the object to be formed 1308 while a spray mechanism 1302 is applying layers of molten metallic alloy 1304 onto a surface 1300. FIG. 13B depicts that the object has been formed, bounded by the surface (not shown) and the additional surface 1310. FIG. 13C depicts that the object 1308, having first been removed from the initial surface, is removed from the additional surface 1310 using a pressing technique. Note that in the illustrated embodiment, the object to be formed has 'extrusion symmetry'—its cross-section is constant throughout its height; as a result, the object 1308 can be removed from the additional surface by a pressing technique. Thus, as can be appreciated, similar techniques can be used in forming objects having extrusion symmetry, i.e. having a constant cross-section. For example, in many embodiments gears having extrusion symmetry can be fabricated using techniques similar to those seen in FIGS. 13A-13C.

Figure 14:
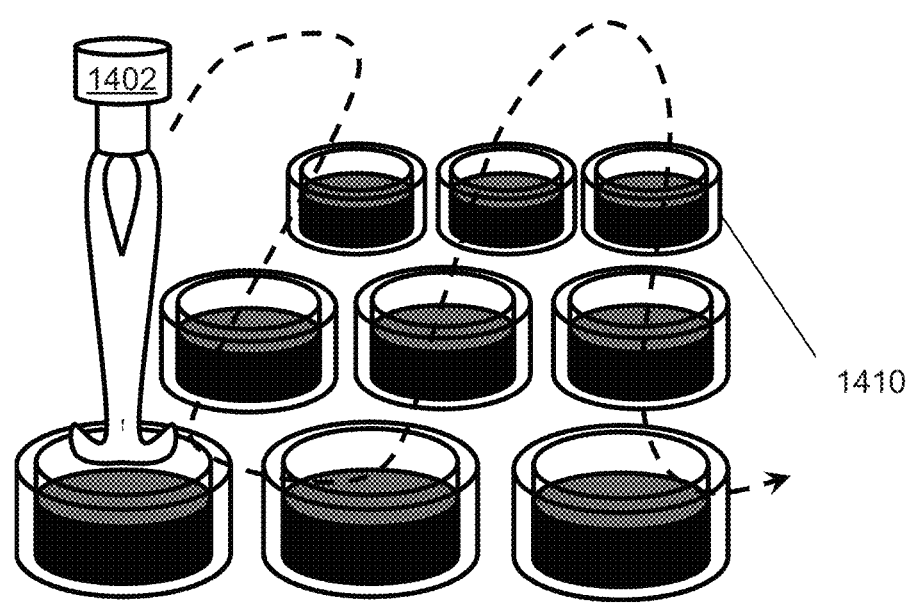
FIG. 14 illustrates fabricating a plurality of objects using a plurality of additional surfaces that can define the shape of the formed object in accordance with embodiments of the invention.

In many embodiments a plurality of mold cavities and/or a plurality of additional surfaces are incorporated so that a plurality of objects can be formed. FIG. 14 illustrates a surface that includes a plurality of additional surfaces that can allow multiple objects to be formed in accordance with embodiments of the invention. In particular, it is illustrated that a plurality of additional surfaces 1410 are incorporated and used to define the shape of objects to be formed. A spraying mechanism 1402 is moved relative to the surfaces 1410, and applies layers of molten metallic glass within them so that the objects can be formed. The additional surfaces 1410 are shown as being tubular in shape and therefore can facilitate the formation of cylindrically shaped objects including amorphous metal. However, it should be understood that the additional surfaces can be of any shape in accordance with embodiments of the invention.

While the techniques described above may have suggested that the layers of molten metallic glass are applied by holding the surface constant and moving a spraying apparatus relative to the fixed surface, the application of molten layers of metallic alloy can occur in any variety of ways. In many embodiments, a spraying mechanism is fixed spatially, and a surface is moved relative to the fixed spraying apparatus during the application of layers of molten metallic alloy. Moreover, while the above-discussion and accompanying figures may have suggested a single spraying apparatus in the fabrication of objects, it should be clear that any number of spraying apparatuses can be utilized in accordance with embodiments of the invention. These variations are now discussed.

Process Variations in the Fabrication of Objects Including Amorphous Metal

In many embodiments, during the application of layers of molten metallic alloy, a spraying apparatus is held fixed in space, and a surface is moved relative to the fixed spraying apparatus; in this way a layer of molten metallic alloy can be applied in a desired pattern. In a number of embodiments, a plurality of spraying apparatuses is used to apply layers of molten metallic alloy. In several embodiments, a plurality of cooling mechanisms is used to cool applied layers of molten metallic alloy.

Figure 15A:
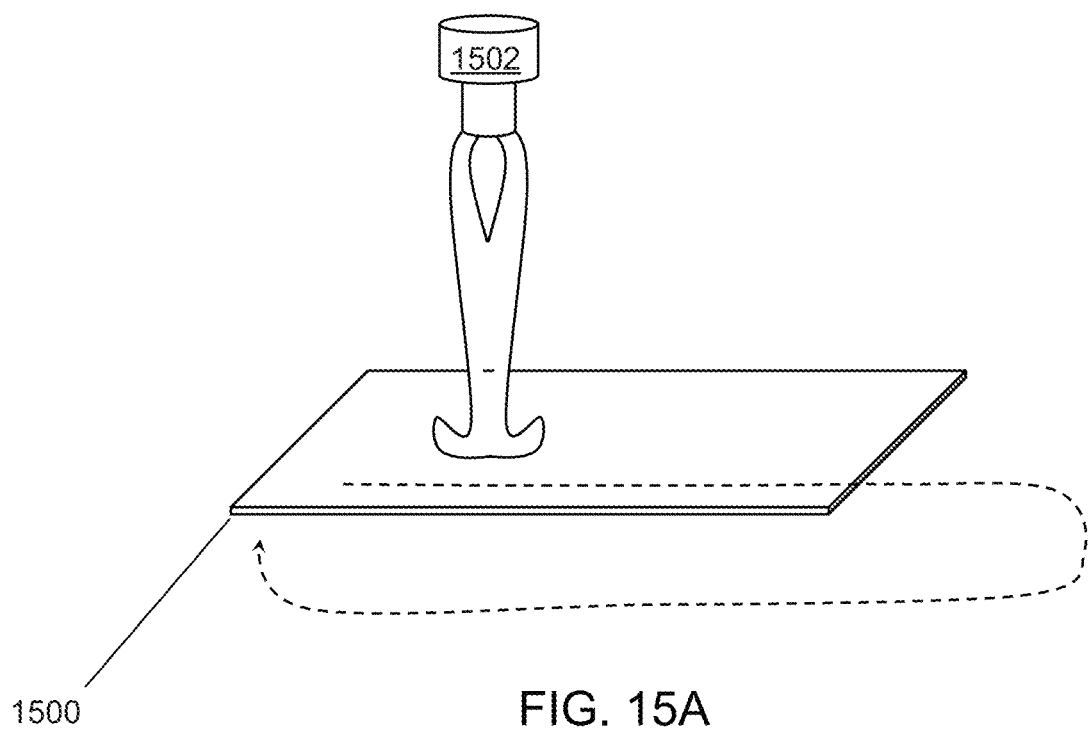
FIGS. 15A-15B illustrate moving a surface relative to a fixed spraying apparatus in fabricating an object including amorphous metal in accordance with embodiments of the invention.
Figure 15B:
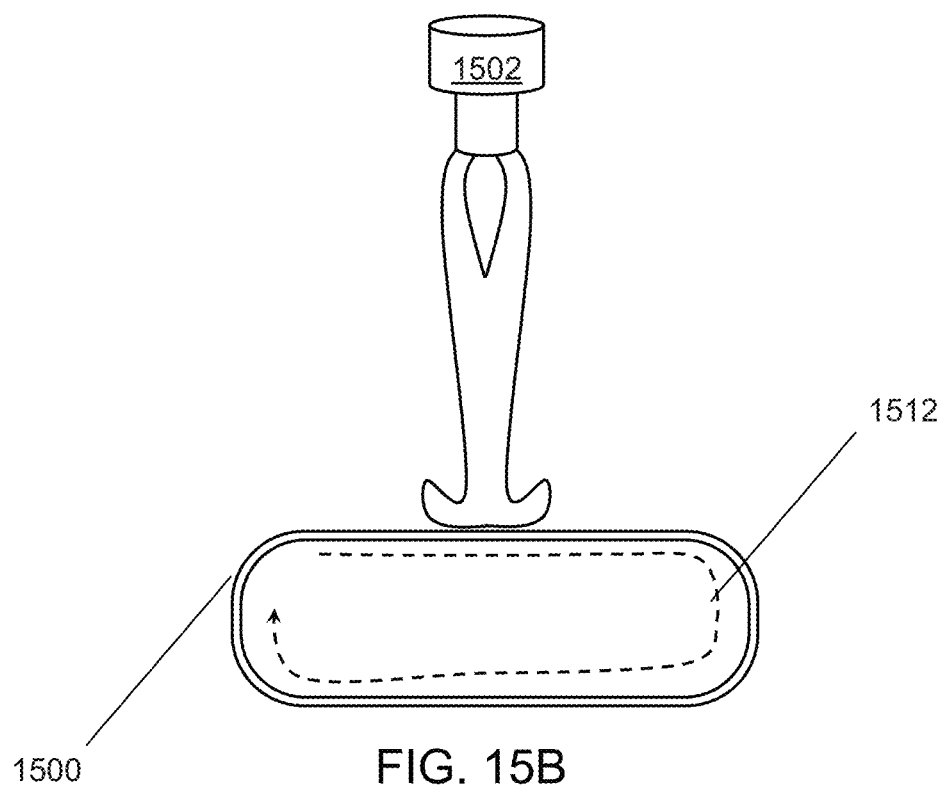

FIGS. 15A-15B illustrate a process for fabricating an object whereby an underlying surface is moved relative to a fixed spraying mechanism during the application of layers of molten metallic alloy in accordance with embodiments of the invention. In particular, FIG. 15A illustrates that an underlying surface 1500 is moved relative to a fixed spraying mechanism 1502 while it is applying a layer of molten metallic alloy. The underlying surface 1500 can be moved so as to cause the layer of molten metallic alloy to be applied in a desired pattern. FIG. 15B illustrates how a conveyor belt can be used to move the underlying surface. In particular, the surface 1500 is depicted as being located on the conveyor belt 1512, such that movement of the conveyor belt will cause movement of the surface 1500. Of course, it should be understood that the underlying substrate can be moved relative to a fixed spraying apparatus in any suitable way in accordance with embodiments of the invention.

Figure 16A:
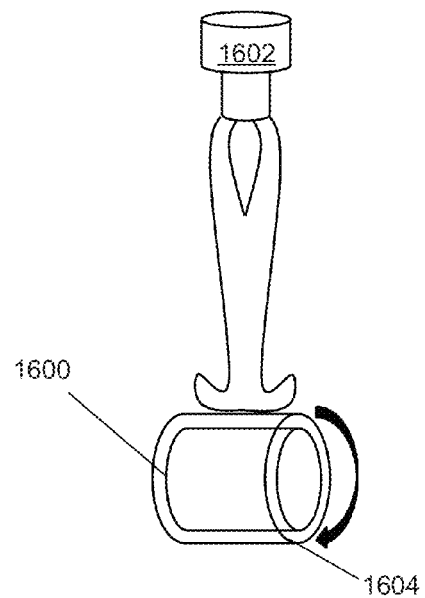
FIGS. 16A-16D illustrate the fabrication of a tube-like structure using a rotating cylindrical surface in accordance with embodiments of the invention.
Figure 16B:
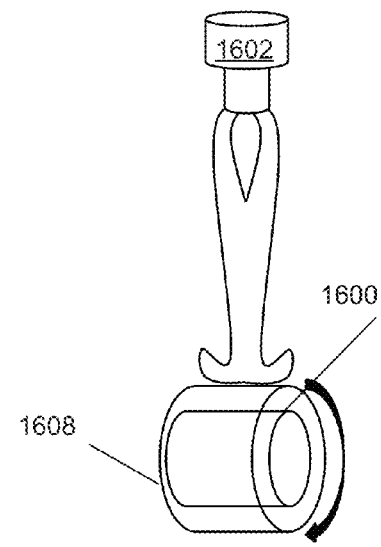
Figure 16C:
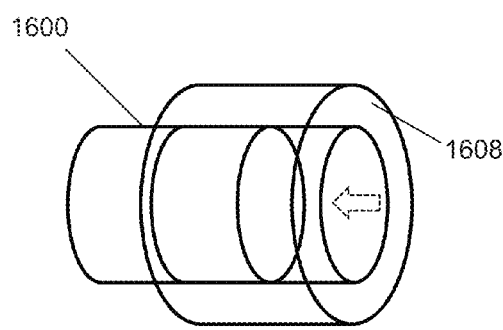
Figure 16D:
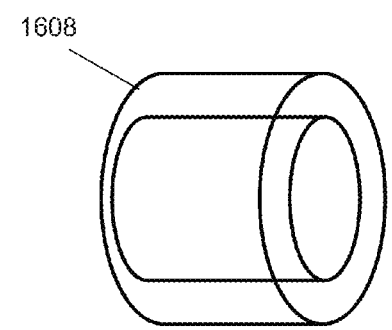

Additionally, as can be appreciated, the surface can be of any shape in accordance with embodiments of the invention. For example, in some embodiments, the surface is cylindrical. FIGS. 16A-16D illustrate the fabrication of a tube-shaped object using a cylindrical surface. In particular, FIG. 16A illustrates a spraying apparatus 1602 being used to deposit a layer of molten metallic alloy 1604 onto a surface 1600 that is in the shape of a cylinder. The surface 1600 is rotating about its central axis, while the spraying apparatus is fixed in location. FIG. 16B illustrates that a tube-like shape that includes amorphous metal 1608 has been formed onto the surface 1600. FIG. 16C illustrates that as the formed object 1608 has extrusion symmetry, it can be removed from the surface 1600 by a pressing technique. FIG. 16D illustrates the formed object having a tube-like shape 1608. Thus, it is seen that surfaces having any of a variety of shapes can be used in the fabrication of objects including amorphous metal in accordance with embodiments of the invention.

Figure 17A:
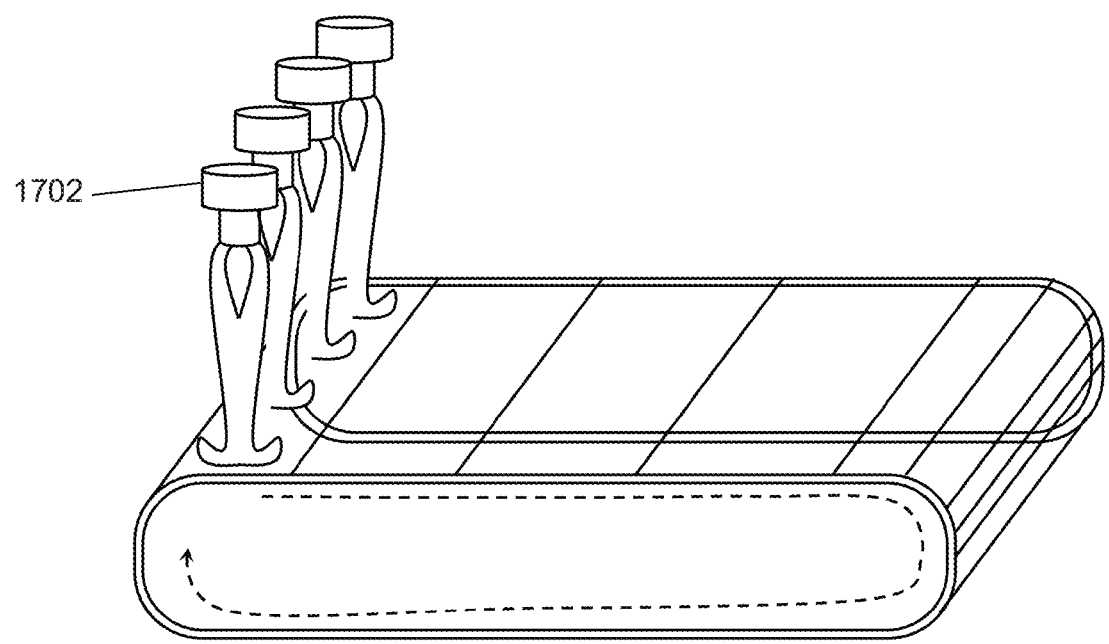
FIGS. 17A-17C illustrate incorporating multiple spraying apparatuses and/or cooling jets in fabricating objects in accordance with embodiments of the invention.
Figure 17B:
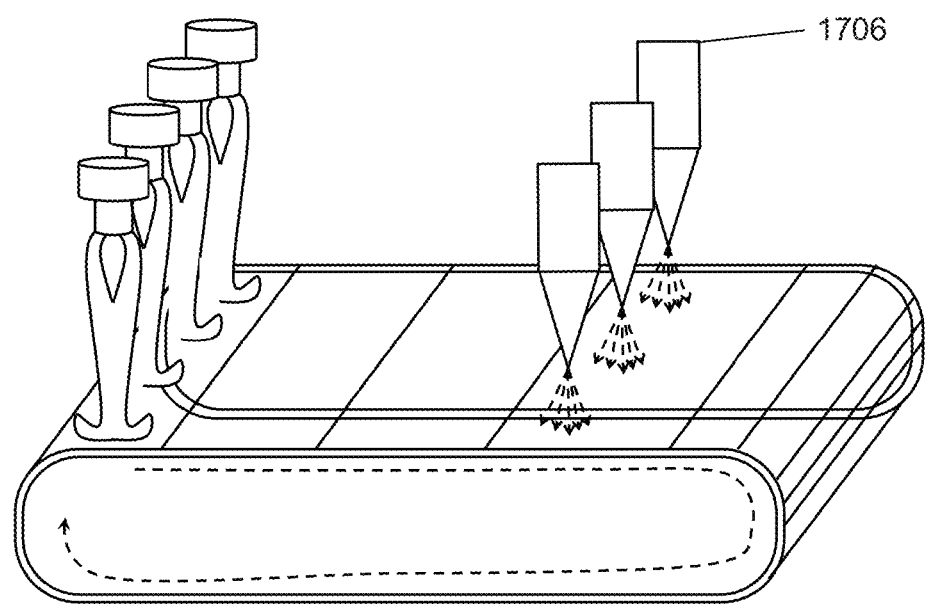
Figure 17C:
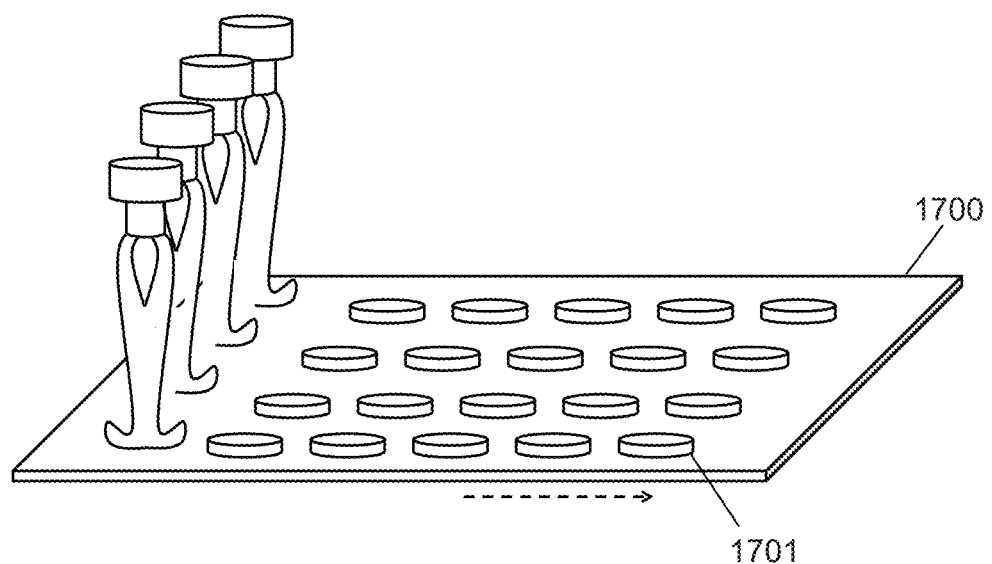

In many embodiments, multiple spraying mechanisms are utilized in applying layers of molten metallic alloy. In a number of embodiments, multiple cooling mechanisms are utilized in cooling applied layers of molten metallic alloy. FIGS. 17A-17C illustrate processes for fabricating objects that include amorphous metal using multiple spraying mechanisms and/or multiple cooling mechanisms in accordance with embodiments of the invention. In particular, FIG. 17A depicts a plurality of spraying apparatuses 1702 that are applying layers of molten metallic alloy onto a surface that is disposed on a conveyor belt. However, it should be understood that a plurality of spraying apparatuses can also apply layers of molten metallic alloy onto a surface that is fixed, and the spraying apparatuses may move relative the fixed layer in order to apply a desired pattern onto the surface in accordance with embodiments of the invention. FIG. 17B illustrates incorporating multiple cooling jets in cooling applied layers of molten metallic alloy in accordance with embodiments of the invention. In particular, FIG. 17B illustrates a similar setup as that seen in FIG. 17A, except that multiple cooling jets 1706 are illustrated that can cool the applied layers of molten metallic alloy. Of course, it should be understood that although cooling jets 1706 are depicted, any of a variety of cooling mechanisms can be used to cool the applied layers of molten metallic alloy. FIG. 17C illustrates that multiple spraying mechanisms can be used in applying molten metallic alloy to a surface including a plurality of mold cavities. In particular, the setup is similar to that seen in FIG. 17A, except that a surface 1700 including multiple mold cavities 1701 is used. Of course, it should be understood that the discussed techniques can be utilized in conjunction with one another in any of a variety of ways in accordance with embodiments of the invention. The illustrated examples are only meant to be illustrative and should not be construed as limiting the scope of the invention.

In general, as can be inferred, the above-described techniques are versatile and can be used to create any of a variety of different objects. For example, the above-described processes are particularly well suited in the fabrication of sheet metal; the fabrication of sheet metal is now described.

Fabricating Sheet Metal that Includes Amorphous Metal

Figure 18A:
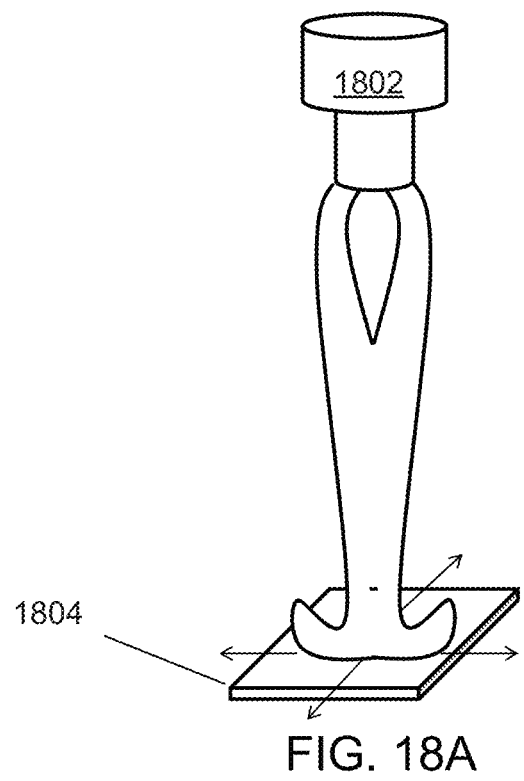
FIGS. 18A-18B illustrate fabricating sheet metal including amorphous metal in accordance with embodiments of the invention.
Figure 18B:
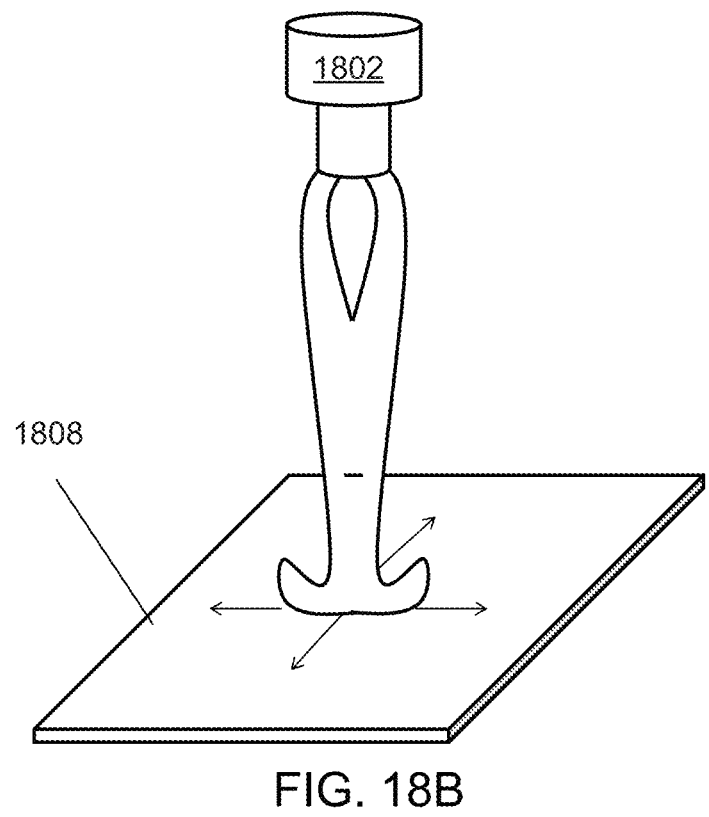

In many embodiments of the invention, molten metallic alloy is iteratively applied and cooled onto a surface to form sheet metal. FIGS. 18A and 18B illustrate the fabrication of sheet metal in accordance with embodiment of the invention. In particular, FIG. 18A illustrates the application of a layer molten metallic alloy 1804 onto a surface (not shown) using a spraying apparatus 1802. FIG. 18B illustrates that the application of the layers of molten metallic alloy is controlled so that the resulting object 1808 is in the shape of sheet metal. The object 1808 can then be removed from the underlying techniques. In the illustrated embodiment, the sheet metal is shown to be in the shape of a rectangular prism (having a small thickness); although, it should be understood that the sheet metal can be fabricated in any planar shape in accordance with embodiments of the invention. Additionally, the sheet metal can fabricated to be any suitable thickness in accordance with embodiments of the invention. As can be appreciated, where sheet metal of thicker dimensions is desired, more layers of molten metallic alloy may be applied. In many embodiments the thickness of the formed sheet metal is between approximately 0.1 mm and approximately 2 mm. Note that sheet metal of these dimensions typically cannot be formed using traditional casting techniques or ribbon quenching techniques. The sheet metal can have any suitable lateral dimensions. In some embodiments the fabricated sheet metal has a lateral surface area of 10 $cm^2$; in several embodiments the fabricated sheet metal has a lateral surface area of 1 $m^2$. Though it should be clear that the lateral surface area can be of any suitable dimension in accordance with embodiments of the invention. As can be appreciated, the sheet metal can then be further formed and thereby used to create any of a variety of apparatuses. Of course, it should be clear that the fabrication of the sheet metal can be accomplished using any of the described techniques and variations; the above discussion with respect to FIGS. 18A and 18B is merely meant to be illustrative. In many embodiments, where sheet metal is being fabricated, the applied layers of molten metallic alloy is of a composition known to form amorphous metal that is relatively more pliable. For example, in many embodiments, layers of one of the following molten compositions are applied to form the sheet metal: Ti—Zr—Cu—Be, Cu—Zr—Ni—Al, Zr—Nb—Ni—Cu—Al, and Zr—Ti—Cu—Ni—Al (note that the relative atomic ratios of the elements are not listed—they can be present in any suitable relative amount in accordance with embodiments of the invention). In general, amorphous alloys that exhibit large supercooled liquid regions and are thus robust to plastic processing techniques are well-suited to the fabrication of sheet metal. In many embodiments, the applied molten metallic alloy is based on one of: zirconium, titanium, copper, nickel, iron, and mixtures thereof. Note that amorphous metals that can be reheated and formed thermoplastically in their supercooled liquid regions above their glass transition temperature and can be cooled into a glass without crystallizing thereafter can allow the formed sheet metal to be used more practicably. To be clear though, the sheet metal can be formed to include any amorphous metal in accordance with embodiments of the invention.

In many embodiments, the solidified layers including amorphous metal are post-processed, and this aspect is now discussed.

Post-Processing of Objects Including Amorphous Metal

In many embodiments, after the layers of molten metallic alloy have been applied and have formed layers including amorphous metal, they are processed to refine their shape. In many embodiments, where sheet metal is formed, the formed sheet metal is subjected to a roller to smoothen the formed sheet metal and thereby mitigate surface imperfections. In several embodiments, a pressing mechanism is used to impose a surface geometry onto solidified layers including amorphous metal. In a number of embodiments, a computer numerical controlled milling procedure is used in post-processing the solidified layers including amorphous metal. Indeed, any of a variety of post-processing techniques can be incorporated in the fabrication of an object in accordance with embodiments of the invention including, but not limited to: rolling, embossing, forging, stamping, heating, or chemically etching.

Figure 19A:
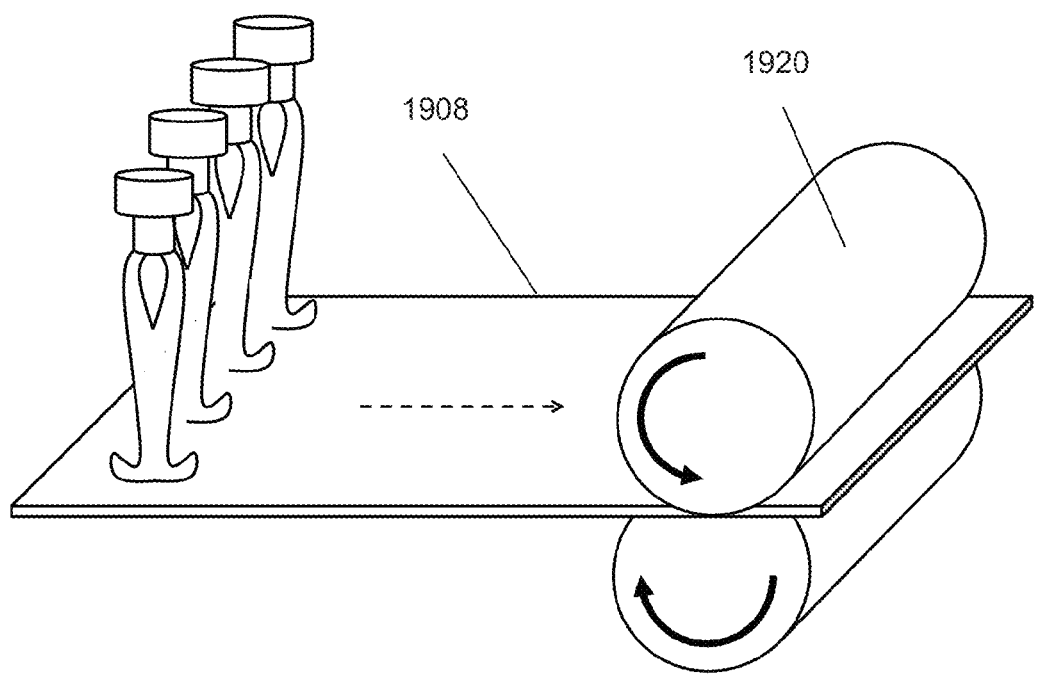
FIGS. 19A-19B illustrate using rollers in the fabrication of sheet metal in accordance with embodiments of the invention.
Figure 19B:
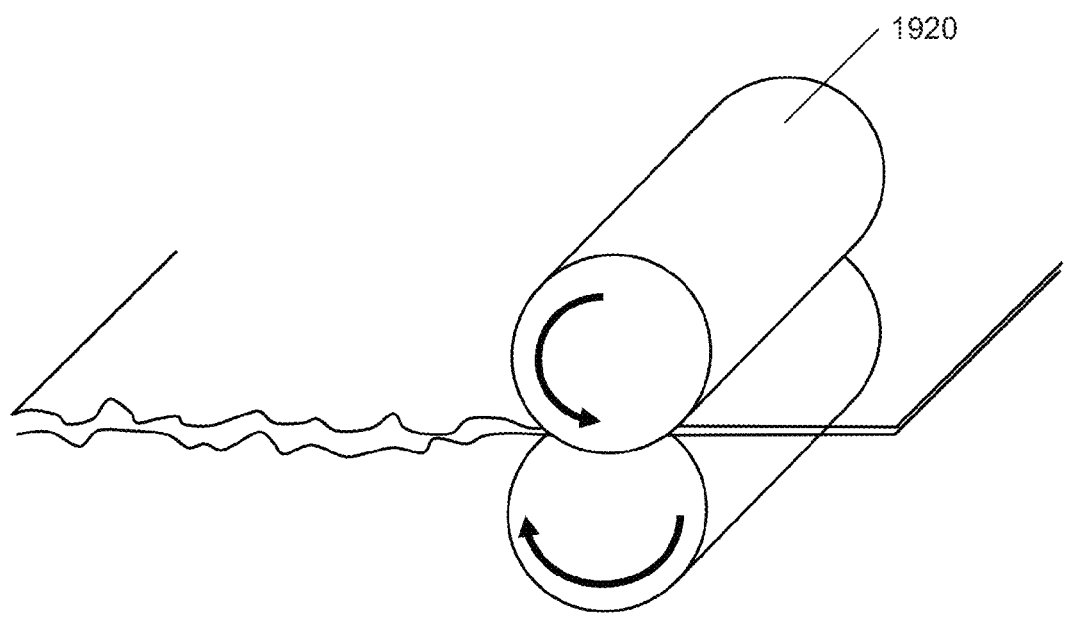

FIGS. 19A-19B illustrate subjecting solidified layers in the shape of sheet metal to rollers to smoothen out any imperfections in the sheet metal in accordance with embodiments of the invention. In particular, FIG. 19A illustrates that the fabricated sheet metal 1908 is subjected to rollers 1920 that help refine the shape of the solidified layers 1908. FIG. 19B illustrates how the rollers 1920 can be used to eliminate imperfections in the shape of the sheet metal in accordance with embodiments of the invention. In this way, the sheet metal can be made to be of higher quality.

Figure 20:
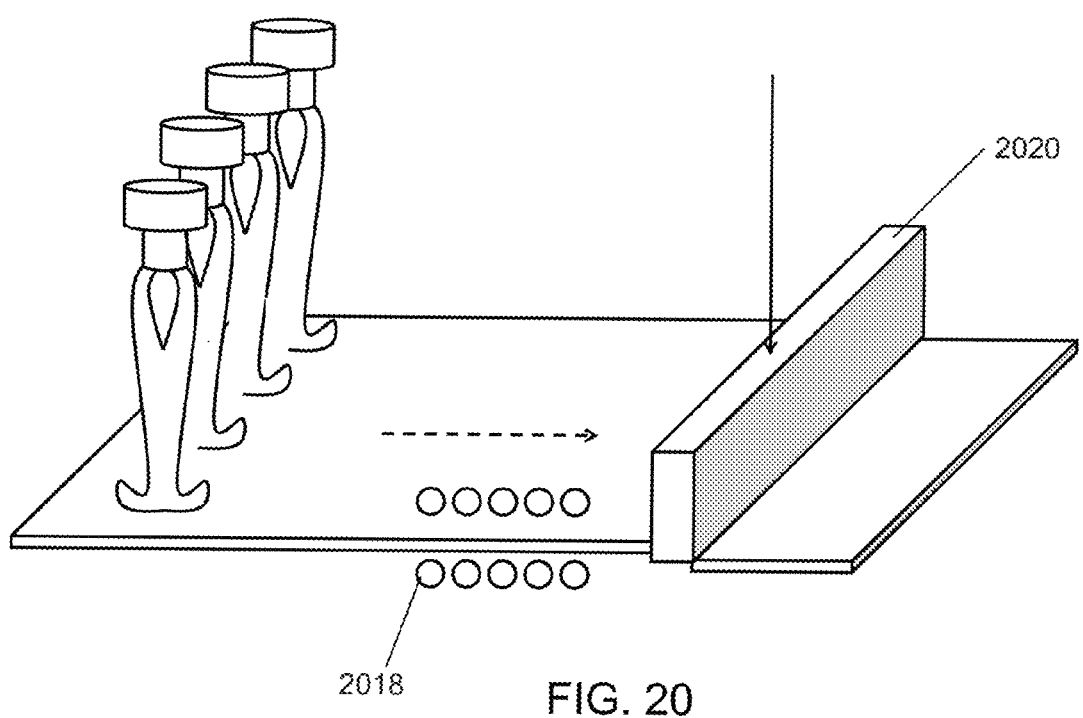
FIG. 20 illustrates using heating elements in conjunction with a press in the fabrication of an object in accordance with embodiments of the invention.

FIG. 20 illustrates using a press to post-process solidified layers including amorphous metal in accordance with embodiments of the invention. In particular, solidified layers that are in the shape of sheet metal are heated using heating elements 2018, and then subjected to a press. The heating elements 2018 can be used to soften the formed sheet metal so that it is pliable and can readily be formed by the press. The press 2020 can be used to impose a particular geometry onto the formed sheet metal.

Figure 21:
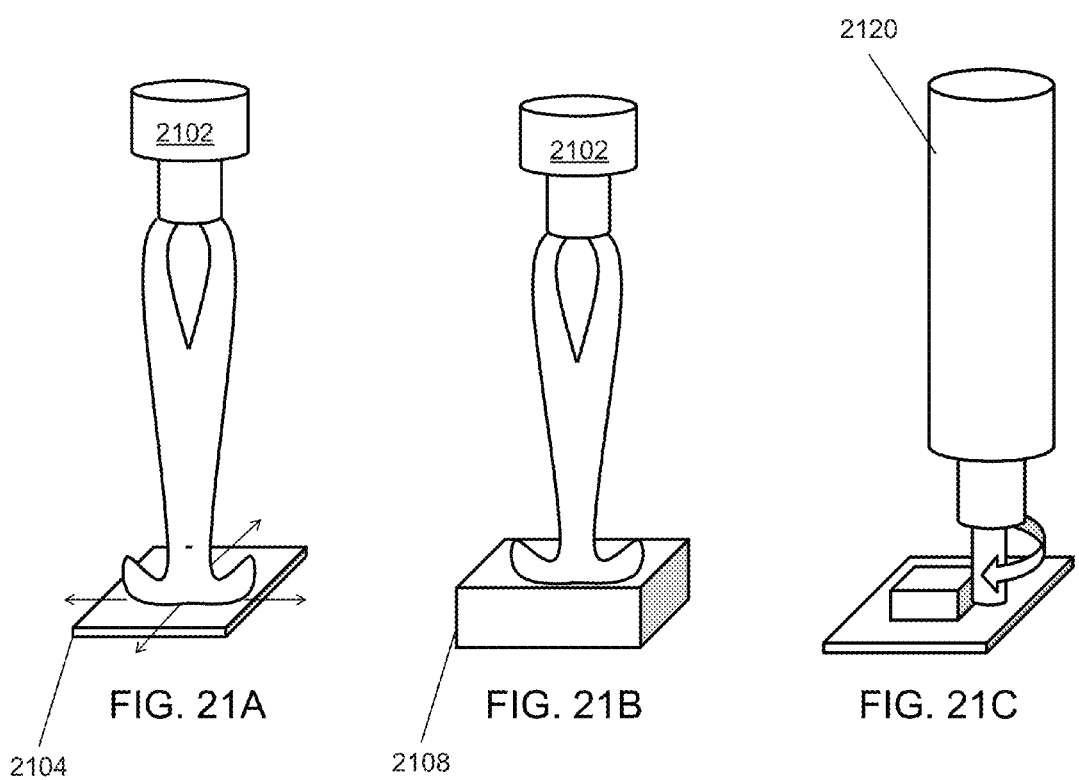
FIGS. 21A-21C illustrate using a computer numerically controlled milling machine in fabricating an object in accordance with embodiments of the invention.

FIGS. 21A-21C illustrate the post processing of solidified layers including amorphous alloy by using a computer numerically controlled milling apparatus. In particular, FIG. 21A illustrates the application of a first layer of molten metallic alloy 2104 to a surface (not shown) using a spraying apparatus 2102. FIG. 21B illustrates that an object 2108 in the shape of a rectangular prism is formed by the application of the layers of molten metallic alloy. FIG. 21C illustrates that a computer numerically controlled milling apparatus 2120 is thereafter used to obtain the desired shape. In general, it can be seen that solidified layers including amorphous metal can be post-processed in any suitable way to obtain a desired shape in accordance with embodiments of the invention. For example, in many embodiments, the solidified layers including amorphous metal are subjected to one of: a rolling process, an embossing process, a forging process, a stamping process, a heating process, a chemical etching process, and mixtures thereof.

Note that in many embodiments of the invention, the solidified layers including amorphous metal are not removed from the surface. In this way, an object containing amorphous metal can be built onto a surface, and this technique is now discussed below.

Fabricating Objects Including Amorphous Metal onto a Surface

In many embodiments, an object including amorphous metal is fabricated onto a surface. In many embodiments, a process similar to that seen in FIG. 1 is used to fabricate an object including amorphous metal onto a surface, except that the solidified layers including amorphous metal are not removed from the surface.

Figure 22:
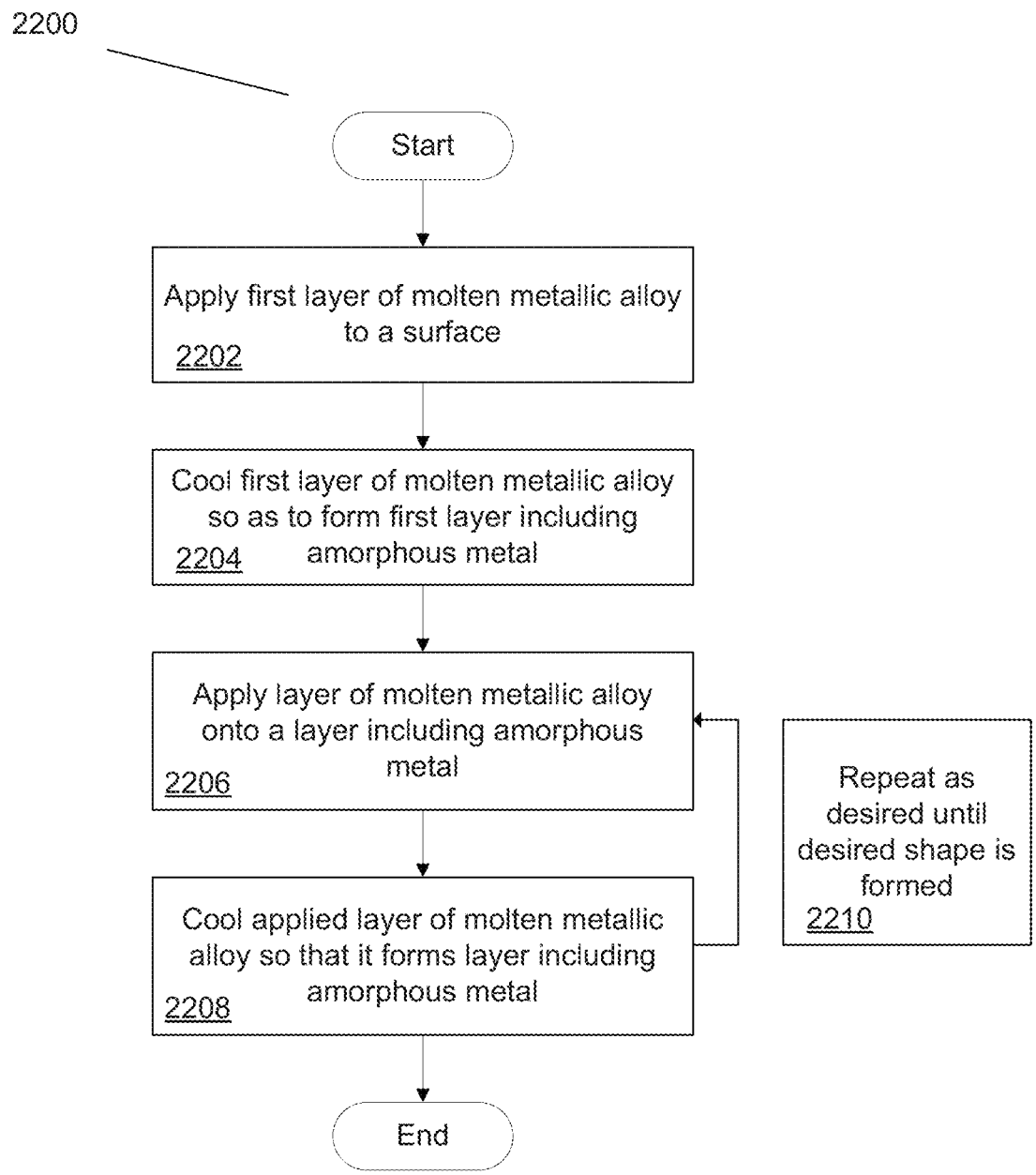
FIG. 22 illustrates fabricating an object including amorphous metal onto a surface in accordance with embodiments of the invention.

FIG. 22 illustrates the fabrication of an object onto a surface in accordance with embodiments of the invention. In particular, FIG. 22 is similar to that seen with respect to FIG. 1, except that solidified layers including amorphous metal are not removed from the surface. In particular, the process 2200 includes: applying 2202 a first layer of molten metallic alloy to a surface; cooling 2204 the first applied layer of molten metallic alloy so as to form a layer including amorphous metal; applying 2206 a layer of molten metallic alloy onto a layer including amorphous metal; cooling the applied layer of molten metallic alloy so that it forms a layer including amorphous metal; and repeating 2210 the application 2206 and cooling 2208 of layers of molten metallic alloy, where the layers are applied so as to form an object of the desired shape (within tolerance). As can be appreciated, the above discussion with respect to FIG. 1 is largely applicable in this context as well. Accordingly, the variations that are discussed above may also be implemented in the process illustrated in FIG. 22 in accordance with embodiments of the invention. Note that in many embodiments, the object that is formed onto a surface includes nuanced features. Thus, in many embodiments, the object includes cross-sections having different shapes. As a result, in many embodiments, at least two layers are applied having different shapes. In other words, at least two applied layers of molten metallic alloy are not coextensive in shape. In this way nuanced features that include amorphous metal can be fabricated onto a surface.

As can be appreciated from the above discussion, the above description is meant to be illustrative and not meant to be a comprehensive definition of the scope of invention. In general, as can be inferred from the above discussion, the above-mentioned concepts can be implemented in a variety of arrangements, including in conjunction with one-another, in accordance with embodiments of the invention. Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What claimed is:

1. A method of fabricating a free-standing object comprising an amorphous metal, the method comprising:

applying a first layer of molten metallic alloy to a surface using a thermal spraying technique and a spot size having a diameter of about 1 to 100 mm, wherein the molten metallic alloy comprises one or more of Ti, Zr, and Cu, wherein the surface comprises a removal promoting material, and wherein the thermal spraying technique is selected from the group consisting of: high velocity oxy-fuel spraying, plasma spraying, wire arc spraying, and mixtures thereof;

cooling the first layer of molten metallic alloy such that it solidifies and thereby forms a first cooled and solidified layer comprising the amorphous metal, wherein the amorphous metal comprises one or more of Ti, Zr, and Cu, and wherein the removal promoting material facilitates separation of the amorphous metal from the surface;

applying a second layer of molten metallic alloy onto the first cooled and solidified layer comprising the amorphous metal using the thermal spraying technique and the spot size having a diameter of about 1 to 100 mm;

cooling the second layer of molten metallic alloy such that it solidifies and thereby forms a second cooled and solidified layer comprising the amorphous metal on the first cooled and solidified layer comprising the amorphous metal;

wherein an aggregate of the cooled and solidified layers comprising the amorphous metal forms a desired shape of the free-standing object to be fabricated; and separating the aggregate of the cooled and solidified layers comprising the amorphous metal from the surface, thereby fabricating the free-standing object comprising the amorphous metal.

2. The method of claim 1, further comprising applying and cooling one or more additional layers of molten metallic alloy to form one or more additional cooled and solidified layers comprising the amorphous metal that are each formed on a previously formed cooled and solidified layer comprising the amorphous metal.

3. The method of claim 1, wherein the feedstock for the thermal spraying technique is selected from the group consisting of: wire, powder, a molten pool of the metallic alloy composition being applied, a molten pool of the constituent elements of the metallic alloy composition being applied, and mixtures thereof.

4. The method of claim 1, wherein the thermal spraying technique utilizes a computer-controlled apparatus.

5. The method of claim 1, wherein multiple thermal spraying apparatuses are used to apply the layers of molten metallic alloy.

6. The method of claim 1, wherein at least one of the layers of molten metallic alloy has a composition that has a critical casting thickness of greater than approximately 1 mm.

7. The method of claim 1, wherein at least one of the layers of molten metallic alloy has a composition that has a critical casting thickness of less than approximately 100 µm.

8. The method of claim 1, wherein at least one of the layers of molten metallic alloy has a different composition than at least one other of the layers of molten metallic alloy.

9. The method of claim 1, wherein at least one of the layers of molten metallic alloy has a thickness of between approximately 10 nanometers and approximately 100 micrometers.

10. The method of claim 1, wherein the amorphous metal comprising one or more of Ti, Zr, and Cu further comprises a composition selected from the group consisting of: a zirconium based composition, a nickel based composition, a cobalt based composition, an iron based composition, a palladium based composition, a platinum based composition, a gold based composition, a copper based composition, a tungsten based composition, a niobium based composition, a hafnium based composition, an aluminum based composition, a composition that includes at least 50% (atomic) of a mixture of Zr—Ti—Be, a composition that includes at least 50% (atomic) of a mixture of Zr—Be, a composition that includes at least 50% (atomic) of a mixture of Cu—Zr, a composition that includes at least 50% (atomic) of a mixture of Cu—Zr—Al, a composition that includes at least 50% (atomic) of a mixture of Fe—Ni, a composition that includes at least 50% (atomic) of a mixture of Ni—P, a composition that includes at least 50% (atomic) of a mixture of Fe—Ni—B, a composition that includes at least 50% (atomic) of a mixture of Fe—P, a composition that includes at least 50% (atomic) of a mixture of Pd—P, a composition that includes at least 50% (atomic) of a mixture of Cu—P, a composition that includes at least 50% (atomic) of a mixture of Al—Y, and a composition that includes at least 50% (atomic) of a mixture of Ni—Nb.

11. The method of claim 1, wherein the free-standing object comprises 25% amorphous metal by volume.

12. The method of claim 1, wherein a shear modulus of the free-standing object is at least 5% lower than if the free-standing object were fabricated using a casting technique.

13. The method of claim 1, wherein a fracture toughness of the free-standing object is at least 10% higher than if the free-standing object were fabricated using a casting technique.

14. The method of claim 1, wherein the surface is one of: a flat surface, a curved surface, or a surface having a periodic cellular structure.

15. The method of claim 1, wherein the surface has axial symmetry, and wherein the first layer of molten metallic alloy is applied to the surface while the surface is being rotated about its axis of symmetry.

16. The method of claim 1, wherein the surface comprises a material selected from the group consisting of: metal, carbide, graphite, ceramic, glass, plastic, and mixtures thereof.

17. The method of claim 1, wherein the removal promoting material comprises a coating of graphite powder.

18. The method of claim 1, wherein the aggregate of the cooled and solidified layers comprising the amorphous metal is separated from the surface by mechanically separating the aggregate of the cooled and solidified layers comprising the amorphous metal from the surface.

19. The method of claim 1, wherein the free-standing object has a thickness of between approximately 0.1 mm and approximately 25 mm.

20. The method of claim 1, wherein the freestanding object has a thickness that is greater than a critical casting thickness of any composition of the applied layers of molten metallic alloy.

21. The method of claim 1, wherein the free-standing object is sheet metal.

22. The method of claim 21, wherein the sheet metal has a thickness of between approximately 0.1 mm and approximately 2 mm.

23. The method of claim 1, further comprising subjecting the aggregate of the cooled and solidified layers including the amorphous metal to one of: a rolling process, an embossing process, a stamping process, a heating process, a chemical etching process, or mixtures thereof.

24. The method of claim 23, wherein the aggregate of the cooled and solidified layers including the amorphous metal is subjected to a rolling process that removes undesired imperfections in the aggregate of the solidified layers including the amorphous metal.

25. The method of claim 1, wherein:
an additional surface is used to define a shape of the free-standing object;
the free-standing object has extrusion symmetry; and
the free-standing object is separated from the additional surface using a pressing technique.

26. A method of fabricating a free-standing object comprising an amorphous metal, the method comprising:
applying a first layer of molten metallic alloy to a surface using a thermal spraying technique and a spot size having a diameter of about 1 to 100 mm, wherein the molten metallic alloy comprises one or more of Ti, Zr, and Cu, wherein the surface comprises a removal promoting material, and wherein the thermal spraying technique is selected from the group consisting of: high velocity oxy-fuel spraying, plasma spraying, wire arc spraying, and mixtures thereof;
cooling the first layer of molten metallic alloy such that it solidifies and thereby forms a first cooled and solidified layer comprising the amorphous metal, wherein the amorphous metal comprises one or more of Ti, Zr, and Cu, and wherein the removal promoting material facilitates separating the amorphous metal from the surface;

applying a second layer of molten metallic alloy onto the first cooled and solidified layer comprising the amorphous metal using the thermal spraying technique and the spot size having a diameter of about 1 to 100 mm; and cooling the second layer of molten metallic alloy such that it solidifies and thereby forms a second cooled and solidified layer comprising the amorphous metal on the first cooled and solidified layer comprising the amorphous metal;

applying and cooling one or more additional layers of molten metallic alloy to form one or more additional cooled and solidified layers comprising the amorphous metal that are each formed on a previously formed cooled and solidified layer comprising the amorphous metal;

wherein at least two of the applied layers of molten metallic alloy are not coextensive in shape; and wherein an aggregate of the cooled and solidified layers comprising the amorphous metal forms a desired shape of the free-standing object to be fabricated.

* * * * *